United States Patent [19]

Deevi et al.

[11] Patent Number: 5,880,439
[45] Date of Patent: *Mar. 9, 1999

[54] FUNCTIONALLY STEPPED, RESISTIVE CERAMIC

[75] Inventors: Seetharama C. Deevi, Midlothian; A. Clifton Lilly, Jr., Chesterfield, both of Va.

[73] Assignee: Philip Morris Incorporated, New York, N.Y.

[ * ] Notice: The term of this patent shall not extend beyond the expiration date of Pat. No. 5,498,855.

[21] Appl. No.: 614,058

[22] Filed: Mar. 12, 1996

[51] Int. Cl.$^6$ .............................. H05B 3/58; H01C 1/012; H01B 1/06; C04B 35/03
[52] U.S. Cl. ......................... 219/535; 219/539; 338/312; 252/506; 252/516; 501/95
[58] Field of Search ..................................... 219/535, 538, 219/539, 542, 543, 552, 553; 338/310, 312, 314; 29/614, 615; 252/506, 516, 518; 501/94, 95, 97

[56] References Cited

U.S. PATENT DOCUMENTS

| | | |
|---|---|---|
| 2,406,275 | 8/1946 | Wejnarth . |
| 2,971,039 | 2/1961 | Westeren . |
| 3,875,476 | 4/1975 | Crandall et al. . |

(List continued on next page.)

FOREIGN PATENT DOCUMENTS 1298808  12/1972  United Kingdom .

OTHER PUBLICATIONS

"Joining of Ceramics" by R.E. Loehman et al., published in *Ceramic Bulletin*, vol. 67 No., 2, pp. 375–380 (1988).

"Oxidation Behavior of Silver–and Copper–Based Brazing Filler Metals for Silicon Nitride/Metal Joints" by R.R. Kapoor et al., published in *J. Am. Ceram. Soc.*, vol. 72 No., 3, pp. 448–454 (1989).

"Brazing Ceramic Oxides to Metals at Low Temperatures" by J.P. Hammond et al., published in *Welding Research Supplement*, pp. 227–232–s, (1988).

"Brazing of Titanium–Vapor–Coated Silicon Nitride" by M.L. Santella published in *Advanced Ceramic Materials*, vol. 3 No., 5, pp. 457–465 (1988).

"Microstructure of Alumina Brazed with a Silver–Copper–Titanium Alloy" by M.L. Santella et al., published in *J. Am. Ceram. Soc.*, vol. 73 No., 6, pp. 1785–1787 (1990).

"New Z–direction Anisotropically Conductive Composites" by S. Jin et al., published in *J. Appl. Phys.*, vol. 64 No., 10, pp. 6008–6010 (1988).

"Composite PTCR Thermistors Utilizing Conducting Borides, Silicides, and Carbide Powders" by T.R. Shrout et al., published in *J. Materials Science*, vol. 26, pp. 145–154 (1991).

"Diffusional Reactions in the Combustion Synthesis of MoSi$_2$" by S.C. Deevi, published in *Materials Science and Engineering*, vol. A149, pp. 241–251 (1992).

"Self–propogating High–temperature Synthesis of Molybdenum Disilicide" by S.C. Deevi, published in *J. Materials Science*, vol. 26, pp. 3343–3353 (1991).

Primary Examiner—Teresa J. Walberg
Assistant Examiner—Sam Paik
Attorney, Agent, or Firm—Burns, Doane, Swecker & Mathis, L.L.P.

[57] ABSTRACT

An electrically powered functionally graded ceramic composite heater and a functionally stepped ceramic composite heater useful for cigarette lighters. The electrical resistance heater includes discrete heating zones wherein each zone of the heater can be activated using an electric control module, and is capable of heating to a temperature in the range of 600° C. to 900° C. using portable energy devices. The ceramic heater can be made by pressing together layers of differing amounts of constituents of the ceramic precursor material followed by secondary processing steps to obtain discrete heating elements. The heater design can include a hub on one end to provide structural integrity, and function as a common for the heating zones.

40 Claims, 14 Drawing Sheets

U.S. PATENT DOCUMENTS

| | | |
|---|---|---|
| 3,895,219 | 7/1975 | Richerson et al. . |
| 4,098,725 | 7/1978 | Yamamoto et al. . |
| 4,110,260 | 8/1978 | Yamamoto et al. . |
| 4,327,186 | 4/1982 | Murata et al. . |
| 4,407,971 | 10/1983 | Komatsu et al. . |
| 4,416,840 | 11/1983 | Lee et al. . |
| 4,449,039 | 5/1984 | Fukazawa et al. . |
| 4,475,029 | 10/1984 | Yoshida et al. . |
| 4,486,651 | 12/1984 | Atsumi et al. . |
| 4,503,319 | 3/1985 | Moritoki et al. . |
| 4,528,121 | 7/1985 | Matsushita et al. . |
| 4,549,905 | 10/1985 | Yamaguchi et al. . |
| 4,555,358 | 11/1985 | Matsushita et al. . |
| 4,634,837 | 1/1987 | Ito et al. . |
| 4,697,165 | 9/1987 | Ishiguro et al. ......................... 219/538 |
| 4,883,947 | 11/1989 | Murase et al. ......................... 219/538 |
| 4,920,640 | 5/1990 | Enloe et al. ............................... 29/852 |
| 5,045,237 | 9/1991 | Washburn . |
| 5,060,671 | 10/1991 | Counts et al. . |
| 5,085,804 | 2/1992 | Washburn . |
| 5,093,894 | 3/1992 | Deevi et al. . |
| 5,139,594 | 8/1992 | Rabin . |
| 5,146,934 | 9/1992 | Deevi et al. . |
| 5,157,242 | 10/1992 | Hetherington et al. . |
| 5,188,130 | 2/1993 | Hajaligol et al. . |
| 5,191,508 | 3/1993 | Axelson ................................. 361/257 |
| 5,223,064 | 6/1993 | Gadkaree ................................. 501/97 |
| 5,224,498 | 7/1993 | Deevi et al. . |
| 5,353,813 | 10/1994 | Deevi et al. . |
| 5,369,723 | 11/1994 | Counts et al. . |
| 5,498,855 | 3/1996 | Deevi et al. . |
| 5,530,225 | 6/1996 | Hajaligol ................................. 219/535 |

FUNCTIONALLY STEPPED, RESISTIVE CERAMIC

CROSS REFERENCE TO RELATED APPLICATIONS

This is related to commonly assigned patent application Ser. No. 08/291,690 filed Aug. 16, 1994, a continuation-in-part of commonly assigned patent application Ser. No. 08/224,848, filed Apr. 8, 1994, which is a continuation-in-part of commonly assigned U.S. Pat. No. 5,388,594, issued Feb. 14, 1995, which in turn is a continuation-in-part of commonly assigned patent application Ser. No. 07/943,504, filed Sep. 11, 1992.

This application also relates to commonly assigned copending patent application Ser. No. 07/943,747, filed Sep. 11, 1992 and to commonly assigned U.S. Pat. No. 5,060,671, issued Oct. 29, 1991; U.S. Pat. No. 5,095,921, issued Mar. 17, 1992; and U.S. Pat. No. 5,224,498, issued Jul. 6, 1992; all of which are hereby incorporated by reference.

1. Technical Field of the Invention

The present invention relates generally to electrically powered ceramic composite heaters for devices such as cigarette lighters and more particularly to a tubular ceramic heater for use in a cigarette lighter.

2. Discussion of the Related Art

Previously known conventional smoking devices deliver flavor and aroma to the user as a result of combustion of tobacco. A mass of combustible material, primarily tobacco, is oxidized as the result of applied heat with typical combustion temperatures in a conventional cigarette being in excess of 800° C. during puffing. Heat is drawn through an adjacent mass of tobacco by drawing on the mouth end. During this heating, inefficient oxidation of the combustible material takes place and yields various distillation and pyrolysis products. As these products are drawn through the body of the smoking device toward the mouth of the user, they cool and condense to form an aerosol or vapor which gives the consumer the flavor and aroma associated with smoking.

Conventional cigarettes must be fully consumed or be discarded once lit. A prior alternative to the more conventional cigarettes include those in which the combustible material itself does not directly provide the flavorants to the aerosol inhaled by the smoker. In these smoking articles, a combustible heating element, typically carbonaceous in nature, is combusted to heat air as it is drawn over the heating element and through a zone which contains heat-activated elements that release a flavored aerosol. While this type of smoking device produces little or no sidestream smoke, it still generates products of combustion, and once lit it is not adapted to be snuffed for future use in the conventional sense.

Commonly assigned U.S. Pat. Nos. 5,093,894; 5,224,498; 5,060,671 and 5,095,921 disclose various electrical smoking systems which significantly reduce sidestream smoke while permitting the smoker to selectively suspend and reinitiate smoking.

U.S. Pat. No. 5,388,594, issued Feb. 14, 1995, describes an electrical smoking system including a novel electrically powered lighter and novel cigarette that is adapted to cooperate with the lighter. The preferred embodiment of the lighter includes a plurality of metallic sinusoidal heaters disposed in a configuration that slidingly receives a tobacco rod portion of the cigarette.

The preferred embodiment of the cigarette of U.S. Pat. No. 5,388,594, issued Feb. 14, 1995, preferably comprises a tobacco-laden tubular carrier, cigarette paper overwrapped about the tubular carrier, an arrangement of flow-through filter plugs at a mouthpiece end of the carrier and a plug at the opposite (distal) end of the carrier, which preferably limits air flow axially through the cigarette.

The preferred embodiment of the cigarette of U.S. Pat. No. 5,388,594, issued Feb. 14, 1995, is essentially a hollow tube between the filter plugs at the mouthpiece end of the cigarette and the plug at the distal end. This construction is believed to elevate delivery to the smoker by providing sufficient space into which aerosol can evolve off the carrier with minimal impingement and condensation of the aerosol on any nearby surfaces. U.S. Pat. No. 5,388,594, issued Feb. 14, 1995, also discloses an electrical smoking article having heaters which are actuated upon sensing of a draw by control and logic circuitry.

U.S. Pat. Nos. 5,060,671 and 5,093,894 disclose a number of possible heater configurations, many of which are made from a carbon or carbon composite material formed into a desired shape. In several of the disclosed configurations, the heater includes a plurality of discrete electrically resistive heating segments that can be individually activated to provide a single puff of flavor to the user. For example, one configuration involves a radial array of blades connected in common at the center and separately connectable at their outer edges to a source of electrical power. By depositing tobacco material on each blade and heating the blades individually, one can provide a predetermined number of discrete puffs to the user. Other configurations include various other arrays of discrete fingers or blades of heater material, or various linear and tubular shapes subdivided to provide a number of discrete heating areas. Such configurations of discrete heating segments may allow for more efficient consumption of power and more efficient use of heater and flavor-generating material.

It has proven difficult, however, to arrange suitable heater materials in the above-described configurations. A suitable heater material must exhibit, among other things, a resistivity sufficient to allow for rapid heating to operating temperatures. It is also desirable that the heater resistance correspond to the energy density of the power source in order to minimize power consumption. Suitable heater materials of low mass, such as those described in the above-incorporated patents, must generally also be of very low density, however, and thus are difficult to arrange in such discrete heater segment configurations. Such low density characteristics complicate, or make impossible, assembly of the configurations by simple, well-known manufacturing techniques. Even after successful manufacture, such configurations are often unacceptably fragile for use within a flavor-generating article. These problems can be overcome to some extent with the aid of highly sophisticated manufacturing techniques. However, in manufacturing the heaters which are disposable and replaceable, these techniques become prohibitively expensive.

It would thus be desirable to provide a discrete heater configuration of suitable heater material that is sufficiently strong for use within a flavor-generating article without threat of breakage during manufacture. It would also be desirable to be able to manufacture such a heater with a discrete heater segment configuration using well-known, inexpensive manufacturing techniques.

Various ceramic heating compositions are described in U.S. Pat. Nos. 5,045,237 and 5,085,804. Also, British Patent No. 1,298,808 and U.S. Pat. Nos. 2,406,275; 3,875,476; 3,895,219; 4,098,725; 4,110,260; 4,327,186; 4,449,039;

4,486,651; 4,555,358 and 4,634,837 relate to electrically conductive ceramic heater materials.

SUMMARY OF THE INVENTION

The invention provides an electrically powered ceramic composite heater useful for devices such as cigarette lighters. The heater includes a heating element of a functionally graded monolithic electrically resistance heating ceramic material, the heating element being adapted to receive a cigarette and heat a portion thereof. In a preferred embodiment, the heating element includes an electrically conductive zone such as an annular hub, with a central axis, and a heating zone such as a plurality of electrically conductive blades, attached to the hub and extending from its perimeter in one direction parallel to the hub's central axis. Each of the blades can have a free end remote from the hub or a hub can be located at each end of the blades. The hub and the blades form a hollow cylinder and the hub and blades comprise the functionally graded monolithic electrically resistance heating ceramic material.

According to one aspect of the invention, the heating element comprises a sintered mixture having an insulative coating on an outer periphery thereof. The ceramic material preferably comprises an insulating compound or semiconductive metal compound A and an electrically conductive metal compound B. Compound A can be $Si_3N_4$, $Al_2O_3$, $ZrO_2$, SiC, $B_4C$, $SiO_2$, glass such as borosilicate glass, and/or $TiO_2$. Compound B can be TiC, $MoSi_2$, $Mo_5Si_3$, $Ti_5Si_3$, $ZrSi_2$, $ZrB_2$, $TiB_2$ and/or aluminides such as iron aluminide, nickel aluminide and titanium aluminide. In a two component $MoSi_2$—$Si_3N_4$ ceramic material, the heating zone can include $Si_3N_4$ in an amount of 55–65 vol. % and $MoSi_2$ in an amount of 45-35 vol. %. The ceramic material can further comprise a reinforcing agent such as fibers or whiskers of SiC, SiN, SiCN, SiAlON. The ceramic material is preferably arranged in layers of different amounts of constituents (e.g., $Si_3N_4$ and $MoSi_2$), the amount of each component (e.g., $Si_3N_4$) varying preferably less than 20 vol. % between adjacent layers. Also, the layers are preferably hot pressed together in a single step rather than being individually pressed.

The heater can have a number of desirable features. For instance, the ceramic material preferably heats to 900° C. in less than 1 second when a voltage of up to 10 volts and up to 6 amps is passed through the ceramic material. The ceramic material also preferably exhibits a weight gain of less than 4% when heated in air to 1000° C. for three hours. Each of the blades can have a resistance (R) of 0.05 to 7 ohms, a length (L), a width (W), and a thickness (T), and the ceramic material has a resistivity ($\partial$), the blade dimensions being in accordance with the formula $R=\partial(L/(W\times T))$. Each of the blades can have an electrical resistance of about 0.6 to 4 ohms throughout a heating cycle between ambient and 900° C.

When the heater is used in a cigarette lighter, the device can include a portable energy device electrically connected to the blades. The portable energy device can have a voltage of about 3 to 6 volts. In this case, each of the blades preferably has an electrical resistance of about 1 ohm throughout a heating cycle between ambient and 900° C. The heater hub can act as the common and/or negative electrical contact for all of the blades. Part or all of the blades and/or hub preferably include a coating of a brazing material suitable for joining ceramic material and electrical leads are preferably connected to the blades by the brazing material. A metal cage comprising a hub and blades can be fitted against the heater hub such that the cage blades extend between the heater blades with air gaps having a width of about 0.1 to 0.25 mm being located between opposed edges of the cage blades and the heater blades.

According to one aspect of the invention, the heater is electrically connected to a lead pin module having leads electrically connected to the heater blades. The heater hub includes at least one air passage therethrough. The free ends of the heater blades are supported by a lead pin module having lead pins electrically connected to the free ends of the heater blades, the heater hub being open and defining a cavity which extends along the heater blades and the cavity being sized to receive a cigarette containing tobacco. The device can further include puff sensing means and electrical circuit means for supplying electrical current to one of the heater blades in response to a change in pressure when a smoker draws on a cigarette surrounded by the heater blades. For instance, each of the blades can have a free end remote from the hub functioning to electrically connect the blade to a power and control module of the cigarette lighter with the hub and blades comprising the functionally graded monolithic electrically resistance heating ceramic material. The cigarette is disposed in proximity to the blades so as to be heated by the blades.

The invention also provides a method of making an electrically powered ceramic composite heater useful for devices such as cigarette lighters. The method includes forming a functionally graded ceramic material by placing layers of varying compositions of the ceramic material in a container and pressing the layers together. The pressed layers are sintered into a compact which can be machined into a heating element of the functionally graded monolithic electrically resistance heating ceramic material, the heating element being adapted to receive a cigarette and heat a portion thereof. The heating element can include a plurality of longitudinally extending and circumferentially spaced-apart blades extending from one end of a cylindrical hub portion wherein the hub is of an electrically conductive composition and the blades are of an electrically resistance heating composition.

The present invention further provides an electrically resistive element comprising: at least one conductive portion consisting essentially of a conductive ceramic component of $MoSi_2$ or $Mo_5Si_3$; at least one electrically resistive portion consisting essentially of the conductive ceramic component and an electrically insulating ceramic component. The electrically resistive element further comprises a transitional portion immediately between the conductive portion and the resistive portion, the transitional portion comprising the conductive ceramic component and the insulating component in mutual proportions such that the transitional portion has a resistivity of approximately 80 to 95% of a resistivity of the conductive portion, the insulating ceramic component constituting at least 15% by volume of the transitional portion.

BRIEF DESCRIPTION OF THE DRAWINGS

The invention is described in conjunction with the accompanying drawings, in which like reference numerals refer to like parts throughout, and in which.

DETAILED DESCRIPTION OF THE PREFERRED EMBODIMENTS

Figure 1:
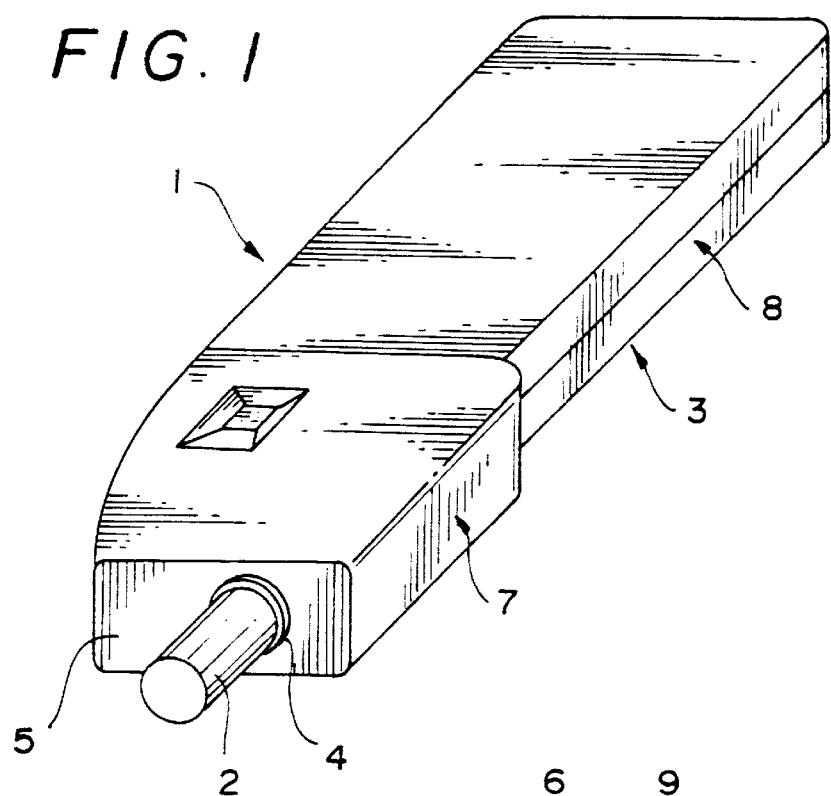
FIG. 1 is a perspective view of an electrical smoking article which utilizes an electrically powered ceramic composite heater in accordance with the present invention.

The invention provides a functionally graded ceramic composite as a resistance heating element and as a structural material that can operate at or above 1200° C. with a creep rate lower by 5 to 6 orders of magnitude than superalloys such as Haynes 214, nickel aluminides and iron aluminides. The ceramic material will provide an electrical resistance heater that can operate up to 1400° C. with excellent oxidation and corrosion resistance. The heater will have a conducting portion for contacts, resistive portion for heating and insulative oxide on an outer surface thereof to prevent electrical shorting.

The invention also provides a simplified arrangement of a ceramic heater with at least 1 ohm resistance and which can withstand exposure to temperatures of 1200° C. or above without degradation in properties. Properties can be selectively adjusted by controlling the relative amounts of components of the ceramic material. The material is preferably layered such that the layers have different compositions to provide different properties. For example, the resistivity can be increased in any particular layer by appropriate choice of constituents and/or relative amounts of the constituents of the ceramic material. Further, the thickness of each layer can be adjusted to provide optimum performance.

$MoSi_2$ and $Mo_5Si_3$ (which has a higher melting point than $MoSi_2$) provide advantages compared to other high temperature materials. For temperature applications below 1000° C., materials such as superalloys in polycrystal or single crystal form and aluminides and their composites such as TiAl, $Ni_3Al$, and NiAl have been used. For temperature applications above 1000° C., ceramic and ceramic composites have been used but such materials become brittle even at 1200° C. since ceramics are intrinsically brittle due to their covalent bonding, whereas superalloys lose their intrinsic strength due to the reinforcements (e.g., γ' prime coarsens and ultimately dissolves). Molysilicides and composites thereof, on the other hand, are ductile at temperatures above 1000° C. Accordingly, as an alternative to superalloys for use at temperatures greater than 1000° C., ceramic and ceramic composites and suicides may be useful. $MoSi_2$ is ductile due to metallic bonds between the Mo—Mo atoms that contribute to their electrical conductivity and are partly covalent thus combining the useful properties of metals and ceramics.

Based on its open structure like other BCC materials, $MoSi_2$ is expected to creep easily. Creep has been found to occur by cube slip on cube planes. For the dislocations (100) to climb, they need to move from Mo to Si to Si to Mo layers. From the phase diagram, since $MoSi_2$ is essentially a line compound (very little solid solubility) of either Mo or Si, the energy of the off-site occupancy is expected to be very high. Hence, the diffusion of Mo or Si is essentially restricted to its layers. Because of restricted slip and restricted diffusion, grain boundaries play a dominant role in providing sources and sinks for the point defects. These contribute to significant grain size effects during creep in these layer materials.

According to one aspect of the invention, a functionally graded ceramic composite is provided which has excellent oxidation resistance, electrical conductivity which can be tailored from metallic to semi-conductive to insulating, thermal conductivity which can be increased to reduce hot spots, thermal expansion coefficient lower than $MoSi_2$ alone, enhanced creep resistance above 1200° C., and stable reinforcements can be incorporated to enhance fracture toughness. As a specific example, high contents of $MoSi_2$ in a $MoSi_2$—$Si_3N_4$ composite can provide an electrical conductor, a mixture $MoSi_2$—$Si_3N_4$ can provide a semi-conductor and a predominant amount of $Si_3N_4$ can provide an insulator. With such a functionally graded composite, intricate machining of the composite to form a heating element can be carried out with electrical discharge machining (EDM).

Materials comprising 100% $MoSi_2$ and composites of $MoSi_2$ with 20, 40, 60 and 80 vol. %, respectively, $Si_3N_4$ were investigated. Process parameters evaluated included packing of layers, sintering temperature, and cooling rate. The electrical resistivity was examined by the four-probe method and the microstructure was examined by SEM, EDAX and TEM. Vickers hardness was measured with loads of 1, 10, 15, 20 and 30 kg. The flexural strength was determined from MOR bars. Fracture toughness was evaluated from crack lengths of indentations. The creep rate was determined in tests carried out at 1200° C. or above across the layers and perpendicular to the layers of the functionally graded material. Oxidation resistance was evaluated at temperatures of 600°–1500° C. in air. The corrosion resistance was investigated with various acids.

One functionally graded material investigated included four layers of which an outer layer consisted of 100% $MoSi_2$, the next inner layer consisted of 60 vol. % $MoSi_2$-40 vol. % $Si_3N_4$, the next layer consisted of 40 vol. % $MoSi_2$-60 vol. % $Si_3N_4$ and the other outer layer consisted of 100% $Si_3N_4$.

A six-layer functionally graded material of $MoSi_2$—$Si_3N_4$ was investigated. The composite consisted of an outer layer of 100% $MoSi_2$, an adjacent layer of 80 vol. % $MoSi_2$-20 vol. % $Si_3N_4$, the next layer of 60 vol. % $MoSi_2$-40 vol. % $Si_3N_4$, the next layer of 40 vol. % $MoSi_2$-60 vol. % $Si_3N_4$, the next layer of 20 vol. % $MoSi_2$-80 vol. % $Si_3N_4$ and the other outer layer of 100% $Si_3N_4$. The thickness of each layer was 4–6 mm. It was found that the first five layers adhered extremely well but layer six could be separated from layer five. As such, the composite was evaluated as a five-layer composite by eliminating layer six.

As a result of the investigations, it has been determined that a bulk functionally graded material of $MoSi_2$—$Si_3N_4$ can be obtained with five layers. The gradation in amounts of $MoSi_2$ between layers should preferably be not more than 50, more preferably not more than 25 vol. %. The creep rate of the $MoSi_2$—$Si_3N_4$ composites is much lower than that of pure $MoSi_2$. Further, the creep rate decreases with an increase in the amount of $Si_3N_4$. An optimum content of $Si_3N_4$ provides a balance between acceptable machinability and creep rate. The oxidation resistance was found to be excellent even at 1400° C.

Figure 2:
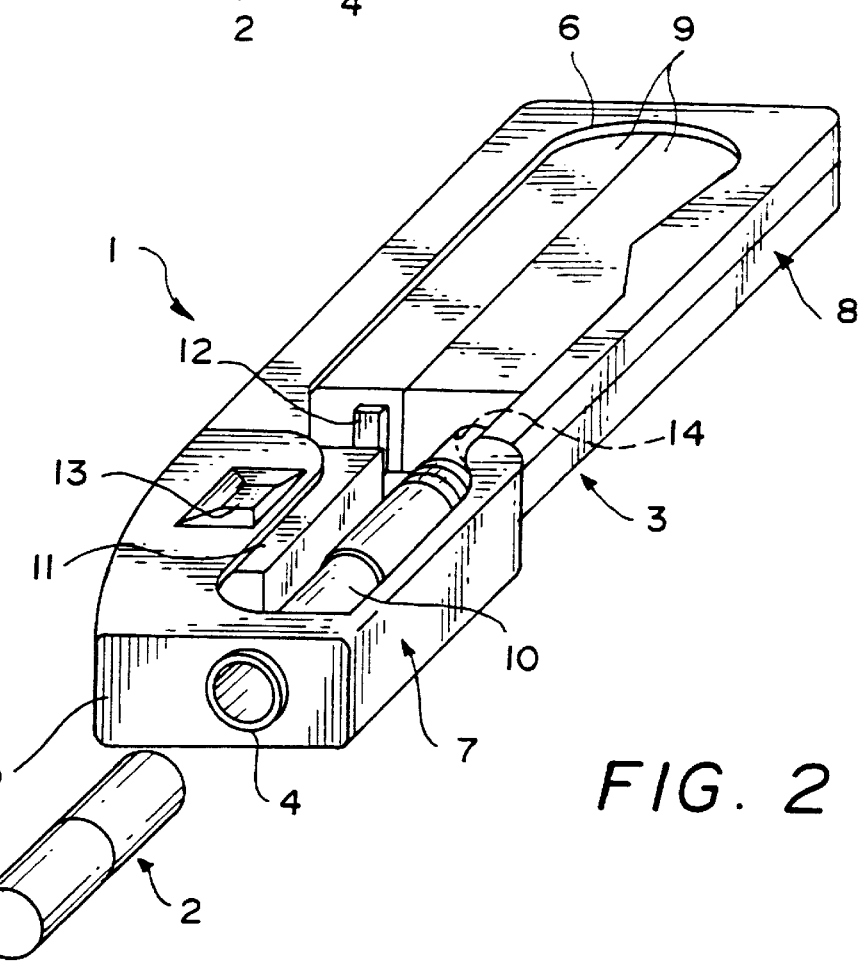
FIG. 2 is an exploded view of the device shown in FIG. 1.

A smoking system 1 according to the present invention is generally seen with reference to FIGS. 1 and 2. The smoking system 1 includes a cylindrical aerosol generating tube or cigarette 2 and a reusable lighter 3. The cigarette 2 is adapted to be inserted in and removed from an orifice 4 at a front end 5 of the lighter 3. The smoking system 1 is used in much the same fashion as a conventional cigarette. The cigarette 2 is disposed of after one or more puff cycles and a preferred cigarette construction described in commonly assigned U.S. Pat. No. 5,388,594 is hereby incorporated by reference. The lighter 3 is preferably disposed of after a greater number of puff cycles than the cigarette 2.

The lighter 3 includes a housing 6 and has front and rear portions 7 and 8. A power source 9 for supplying energy to heating elements for heating the cigarette 2 is preferably disposed in the rear portion 8 of the lighter 3. The rear portion 8 is preferably adapted to be easily opened and closed, such as with screws or with snap-fit components, to facilitate replacement of the power source 9. The front portion 7 preferably houses heating elements and circuitry in electrical communication with the power source 9 in the rear portion 8. The front portion 7 is preferably easily joined to the rear portion 8, such as with a dovetail joint or by a socket fit. The housing 6 is preferably made from a hard, heat-resistant material. Preferred materials include metal-based or more preferably, polymer-based materials. The housing 6 is preferably adapted to fit comfortably in the hand of a smoker and, in a presently preferred embodiment, has overall dimensions of 10.7 cm by 3.8 cm by 1.5 cm.

The power source 9 is sized to provide sufficient power for heating elements that heat the cigarette 2. The power source 9 is preferably replaceable and rechargeable and may include devices such as a capacitor, or more preferably, a battery. In a presently preferred embodiment, the power source is a replaceable, rechargeable battery such as four nickel cadmium battery cells connected in series with a total, non-loaded voltage of approximately 4.8 to 5.6 volts. The characteristics required of the power source 9 are, however, selected in view of the characteristics of other components in the smoking system 1, particularly the characteristics of the heating elements. U.S. Pat. No. 5,144,962 describes several forms of power sources useful in connection with the smoking system of the present invention, such as rechargeable battery sources and quick-discharging capacitor power sources that are charged by batteries, and is hereby incorporated by reference.

Figure 3:
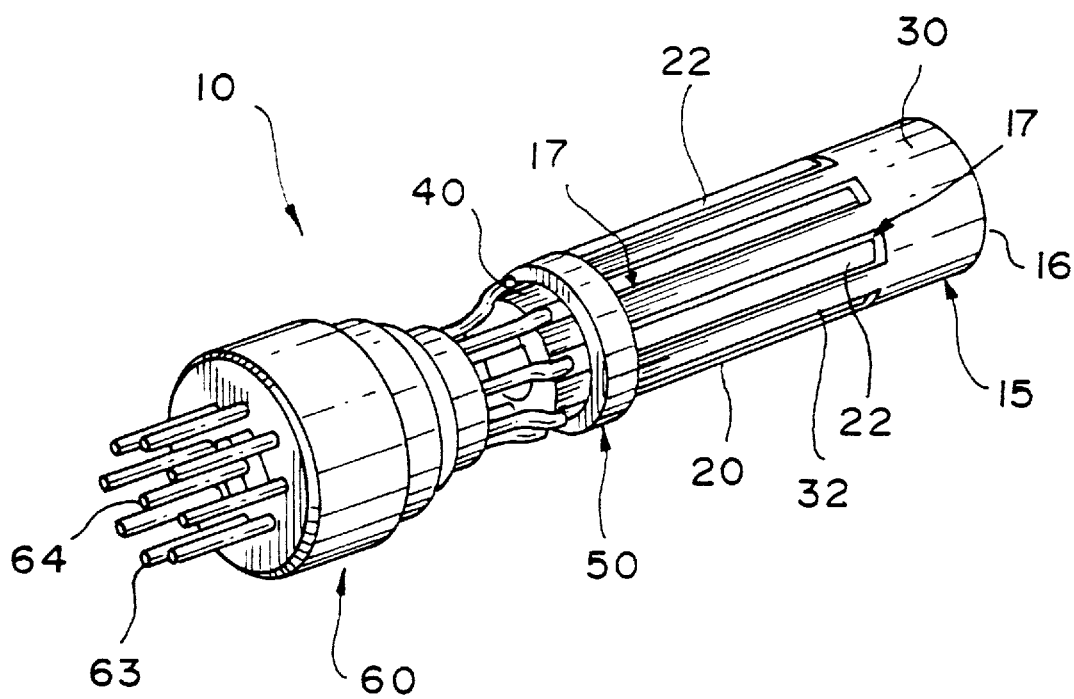
FIG. 3 is a perspective view of a ceramic heater assembly in accordance with the present invention.
Figure 4:
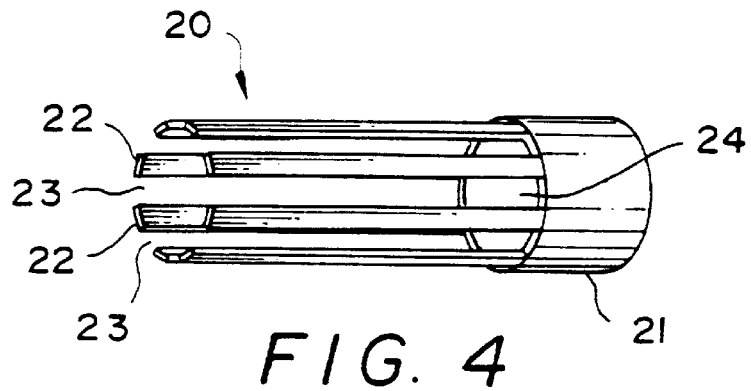
FIG. 4 is a perspective view of a monolithic ceramic heater in accordance with the present invention.
Figure 5:
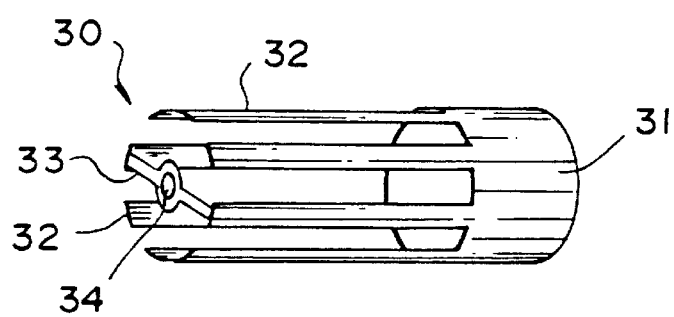
FIG. 5 is a perspective view of an electrically conducting metal cage in accordance with the present invention.
Figure 7:
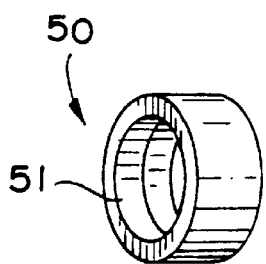
FIG. 7 is a perspective view of a retainer ring in accordance with the present invention.
Figure 6:
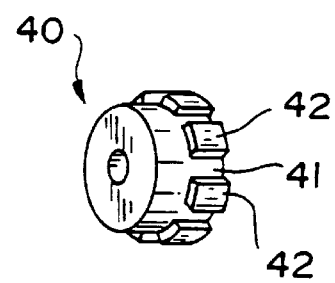
FIG. 6 is a perspective view of a fixture in accordance with the present invention.
Figure 8:
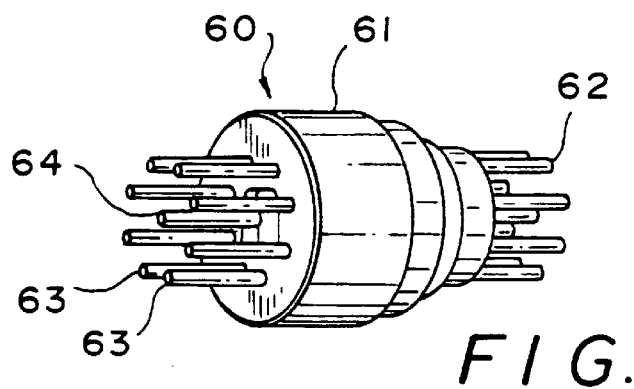
FIG. 8 is a perspective view of a pin module in accordance with the present invention.

A substantially cylindrical heater assembly 10 (see FIG. 3) for heating the cigarette 2, and, preferably, for holding the cigarette in place relative to the lighter 3, and electrical control circuitry 11 for delivering a predetermined amount of energy from the power source 9 to heating elements (not seen in FIGS. 1 and 2) of the heater assembly are preferably disposed in the front 7 of the lighter. As described in greater detail below, a generally circular, monolithic ceramic heating element 20, as shown in FIG. 4, is fixed, e.g., brazed or welded, to be disposed within the interior of heater assembly 10. The heater element 20 includes a hub 21 and a plurality of longitudinally extending and circumferentially spaced apart blades 22. The heater preferably has only one end hub but other designs can be used. For instance, the heater could include two end hubs with the blades extending therebetween. Further, the blades can have a non-linear configuration.

In the presently preferred embodiment, the heater element 20 includes a plurality of spaced apart rectilinear heating blades 22 extending from the hub 21, seen in FIG. 4 and described in greater detail below, that are individually energized by the power source 9 under the control of the circuitry 11 to heat a number of, e.g., eight, areas around the periphery of the inserted cigarette 2. Eight heating blades 22 are preferred to develop eight puffs as in a conventional cigarette and eight heater blades also lend themselves to electrical control with binary devices. However, any desired number of puffs can be generated, e.g., any number between 5–16, and preferably 6–10 or 8 per inserted cigarette and the number of heating blades can exceed the desired number of puffs/cigarette.

The circuitry 11 is preferably activated by a puff-actuated sensor 12, seen in FIG. 1, that is sensitive to pressure drops that occur when a smoker draws on the cigarette 2. The puff-actuated sensor 12 is preferably disposed in the front 7 of the lighter 3 and communicates with a space inside the heater fixture 10 and near the cigarette 2. A puff-actuated sensor 12 suitable for use in the smoking system 1 is described in U.S. Pat. No. 5,060,671, the disclosure of which is incorporated by reference, and is in the form of a Model 163PC01D35 silicon sensor, manufactured by the MicroSwitch division of Honeywell, Inc., Freeport, Ill., or a type SL8004D sensor, available from SenSyn Incorporated, Sunnyvale, Calif., which activates an appropriate one of the heater blades 22 as a result of a change in pressure when a smoker draws on the cigarette 2. Flow sensing devices, such as those using hot-wire anemometry principles, can also be used for activating an appropriate one of the heater blades 22 upon detection of a change in air flow.

An indicator 13 is preferably provided on the exterior of the lighter 3, preferably on the front 7, to indicate the number of puffs remaining on a cigarette 2 inserted in the lighter. The indicator 13 preferably includes a seven-segment liquid crystal display. In a presently preferred embodiment, the indicator 13 displays the digit "8" for use with an eight-puff cigarette when a light beam emitted by a light sensor 14, seen in FIG. 1, is reflected off of the front of a newly inserted cigarette 2 and detected by the light sensor. The light sensor 14 provides a signal to the circuitry 11 which, in turn, provides a signal to the indicator 13. For example, the display of the digit "8" on the indicator 13 reflects that the preferred eight puffs provided on each cigarette 2 are available, i.e., none of the heater blades 22 have been activated to heat the new cigarette. After the cigarette 2 is fully smoked, the indicator displays the digit "0". When the cigarette 2 is removed from the lighter 3, the light sensor 14 does not detect the presence of a cigarette 2 and the indicator 13 is turned off. The light sensor 14 is preferably modulated so that it does not constantly emit a light beam and provide an unnecessary drain on the power source 9. A presently preferred light sensor 14 suitable for use with the smoking system 1 is a Type OPR5005 Light Sensor, manufactured by OPTEK Technology, Inc., 1215 West Crosby Road, Carrollton, Tex. 75006.

As one of several possible alternatives to using the above-noted light sensor 14, a mechanical switch (not shown) may be provided to detect the presence or absence of a cigarette 2 and a reset button (not shown) may be provided for resetting the circuitry 11 when a new cigarette is inserted in the lighter 3, e.g., to cause the indicator 13 to display the digit "8", etc. Also, the puff sensor could be omitted and a mechanical switch can be provided to activate the heater when the switch is activated by a smoker. The power sources, circuitry, puff-actuated sensors, and indicators described in U.S. Pat. No. 5,060,671 and U.S. patent application Ser. No. 07/943,504, can be used with the smoking system 1 and are hereby incorporated by reference.

A presently preferred heater embodiment is shown in FIGS. 3–8. This heater provides improved mechanical strength for the repeated insertions, adjustments and removals of cigarettes 2 and significantly reduces the escape of aerosols from a heated cigarette to decrease exposure of sensitive components to condensation. If provisions are not made to control condensation, the generated aerosols will tend to condense on relatively cool surfaces such as heater pins 62 (see FIG. 3), heater hub 21, the outer sleeve, electrical connections, control and logic circuitry, etc., potentially degrading or disabling the smoking article. It has been found that the generated aerosols tend to flow radially inward away from a pulsed heater.

Generally, there are preferably eight heater blades 22 to provide eight puffs upon sequential firing of the heater blades 22, thereby simulating the puff count of a conventional cigarette, and correspondingly eight barrier blades 32. The heater assembly 10 also includes a cage 30 having a hub 31 and barrier blades 32. Specifically, the heater element 20 and cage 30 are arranged such that the heater blades 22 and barrier blades 32 are respectively interposed or interdigitated to form a cylindrical arrangement of alternating heater and barrier blades. Also, gaps 17 can be provided between opposed edges of the heater blades 22 and barrier blade 32.

The heater assembly 10 is fabricated such that it preferably has a generally tubular or cylindrical shape. As best seen in FIG. 3, the heater element 20 and cage 30 are open at one end and together define a tube 15 having a generally circular open insertion end 16 for receipt of an inserted cigarette 2. Insertion end 16 preferably has a diameter sized to receive the inserted cigarette 2 and ensure a snug fit for a good transfer of thermal energy. Given acceptable manufacturing tolerances for cigarette 2, a gradually narrowing area or throat in the heater element could be provided to slightly compress the cigarette to increase the thermal contact with the surrounding heater blades 22. For instance, the blades 22 could taper inwardly or the cage blades 32 could be bent inwardly to increase thermal contact with the cigarette.

The heater element 20 of the present invention is configured as a cylinder of discrete finger-like heater blades 22. The heater configuration includes the annular hub 21 and a plurality of electrically conductive rectilinear blades 22 extending from the perimeter of the hub in one direction parallel to the hub's central axis to form an extended cylinder. The heater element 20 is unitarily formed from an electrically conductive ceramic composition. The tips of the free ends of the blades remote from the hub 21 can act as the positive electrical contacts for the heater and the hub can act as the common negative electrical contact. However, alternative circuit arrangements can be used provided the blades are individually supplied with a source of electrical energy suitable for sequentially heating the blades in any desired order.

In order to facilitate the user's draw of the flavor-containing aerosol, air passages can be provided through the heater element 22. As shown in FIG. 4, spaces 23 provided between blades 22 and a passage 24 through hub 21 provide for the desired flow of air through the heating element 20.

As mentioned above, the tips of the blades can act as positive electrical terminals, and the hub can act as the negative electrical terminal. These terminals, or contacts, are preferably coated with a suitable brazing material which will later be described in more detail.

The heater of the present invention is preferably manufactured so that each blade 22 has a nominal resistance, capable of being quickly heated by a pulse of electrical power from a portable and lightweight power supply. For instance, the resistance of each blade 22 can be in the range of 0.5 to 7 $\Omega$, preferably 0.8 to 2.1 $\Omega$ for a 4 to 6 volt power supply or 3–7 $\Omega$ for a larger power supply. A blade 22 with a resistance of about 1 $\Omega$ can be powered by a small 3.6 V battery, and need only draw about 3–5 calories of energy to reach operating temperatures above 900° C. within a preferable period of 1 second. According to the invention, the blades are of a ceramic material having low resistivity preferably in the range of $8 \times 10^{-4}$ to $2 \times 10^{-2}$ ohm-cm, more preferably 4 to $6 \times 10^{-3}$ ohm-cm. Such low and narrow resistivity values can be achieved by selecting suitable ceramic constituents (plus optional intermetallic/metal/reinforcement constituents) and adjusting the amounts thereof to achieve the desired resistivity. On the other hand, in order to increase the resistance of a composite heater (having a resistivity of $10^{-5}$ to $10^{-4}$ ohm-cm) to the desired 1 $\Omega$ resistance value, it is necessary to either increase the length of the heater (which is unacceptable due to space and timing limitations) or decrease the thickness or density of the heater. However, decreasing heater density results in excess porosity which decreases heater strength and complicates processing. Thus, the ceramic heating material according to the invention offers advantages over other heater materials such as carbon.

The heater configuration, or geometry, not only provides structural support, but also can be varied to optimize heater resistance. That is, the blade resistance and strength can be optimized by varying the width and thickness of the blade, using the following formula:

$$R = \partial(L/(W \times T))$$

where

R=resistance of the blade;
∂=resistivity of the heater material;
L=length of the blade;
W=width of the blade; and
T=thickness of the blade.

Based on the above formula, the L, W and T dimensions can be selected based on the desired resistance of a heater blade and resistivity of the ceramic composite material. As an example, if the resistivity is in the range of 0.004 to 0.006 Ω-cm, the blades can have a length L of about 10 to 20 mm, a width W of about 1.5 to 2 mm and thickness T of about 0.25 to 0.5 mm. In addition, the overall heater can have an outer diameter of about 8 mm, an inner diameter of about 7.2 to 7.4 mm and a length of about 30 mm.

The electrical resistance heater of the present invention can be manufactured by any suitable technique. For instance, the ceramic material can be formed into a desired shape and sintered by the following techniques. Ceramic material preferably has low density, a resistivity of about $10^{-2}$ to $10^{-3}$ ohm per cm, oxidation resistance at or above 800°–1000° C. and a high melting point. The composition of the ceramic material is preferably graded with respect to ingredients and proportions to achieve desired characteristics. For instance, the volume % of conductive material can be selected so that a small change in the proportions of the constituents does not precipitate a huge change in resistivity. The temperature coefficient of resistivity can be adjusted by balancing the components of the ceramic composition. For instance, SiC has a negative temperature coefficient of resistance (resistance drops as temperature increases) and $MoSi_2$ has a positive temperature coefficient of resistance (resistance increases with temperature), these two components being proportioned to provide a relatively fixed resistance throughout the heating cycle. The oxidation resistance can be achieved by selecting appropriate oxidation resistant components. For instance, $Si_3N_4$, SiC and $MoSi_2$ are oxidation resistant whereas TiC is not. Further, $Si_3N_4$, SiC and $MoSi_2$ will form an adhered silica layer along the surfaces of the heater. Low density can be achieved by selecting the appropriate constituents whereby an essentially low density pore-free material can be provided. A lower density material is desirable since it requires less energy to obtain the same maximum temperature during a resistive heating cycle. The selection and proportion of ceramic starting materials and the processing thereof achieve a workable final density. Finally, the constituents can be selected so as to provide low dissociation vapor pressures.

The ceramic material can be processed in a number of ways. For instance, if injection molding is used, the powdered ceramic constituents can be mixed together along with binders and plasticizers, if desired, the mixed powders can be injection molded at 250° C., the molded piece can be presintered at 1000° to 1200° C. to produce a green, pre-formed machinable piece whose binder and plasticizer have been driven off, the presintered piece can be machined to final shape and hot isostatically pressed to the final density at 1700° to 1800° C. and 250 to 650 MPa. If cold-isostatic pressing is used, the powdered ceramic material can be slip cast in the shape of a tube using cold isostatic pressing techniques (without binders), pressure can be applied 3-dimensionally to obtain a rod followed by presintering, machining to final shape and sintering again to full density. If high temperature extrusion is used, a continuous rod of ceramic material can be extruded at about 1300° to 1700° C. and the extruded rod can be subjected to cutting and grinding at spaced locations along the rod to a final shape.

Figure 9:
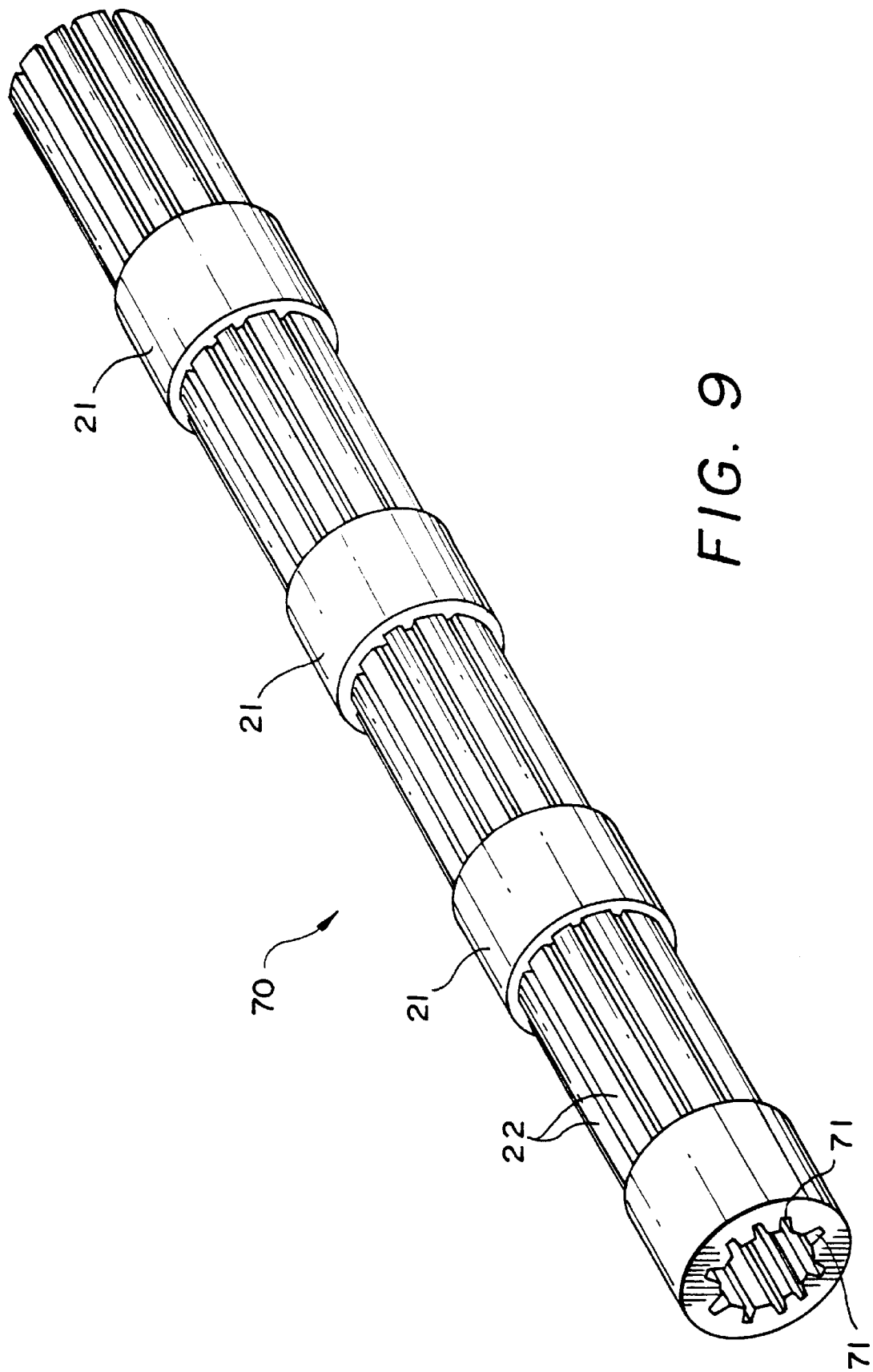
FIG. 9 is a perspective view of a segment of a precursor of the heater of FIG. 4.

In the primary step, a tube 70 is formed in the shape of a cylinder, as shown in FIG. 9. The outer surface of the tube 70 preferably corresponds in diameter to that of hub 21 of the finished heater element 20. In addition, the tube 70 can be extruded to include grooves along the length thereof such as channels 71 on the inner periphery of the tube 70.

The shape of the extruded tube 70 is then finished by suitable techniques such as grinding or machining. Grinding can be carried out at high speeds on extruded tubes 4" to 12" long whereby portions of the outer surface of tube 70 can be removed to penetrate channels 71 and to expose individual blades 22.

After grinding, the separation of the tube into individual heating segments can be accomplished by high speed cutting of the extruded tube, preferably with electrical discharge machining (or a laser). Techniques such as electroplating, sputtering, evaporation, or flame spraying may be used for deposition of brazing material on the contact areas of heater element 20. The choice of technique depends on the brazing material and its melting point.

The electrical resistance heater 20 may be formed by powder metallurgical techniques using particles of the constituents of the ceramic material. The particles can be obtained from green or calcined ceramic materials or precursors thereof. The size of the particles preferably should be in the form of small particles having a suitable size. Also, if metals such as Nb are incorporated in the ceramic material, it is desirable to use a particle size which avoids undesirable reactions during sintering of the ceramic material. For instance, 100 to 200 μm Nb particles will not adversely react with Si whereas 5 μm Nb particles could form undesirable amounts of NbSi. Details of procedures for mechanical alloying Nb particles with ceramic constituents such as $MoSi_2$ are disclosed in *High Temperature Structural Silicides* by A. K. Vasudevan et al., 1992, Elsevier Science Publishers B. V., Amsterdam, The Netherlands, the disclosure of which is hereby incorporated by reference. Various types of mills such as jet mills or other grinders may be used to grind the particles down to the desired size.

The electrical resistance heater preferably has a density of from about 3 g/cc to about 6 g/cc. The density may be adjusted to optimize the weight and strength of the heater blades.

During baking, the extruded material will shrink. Therefore, the extruded material should be shaped or extruded to a size larger than required for use as heat source in order to account for this shrinkage.

The shaped/extruded material can be presintered and sintered in a suitable atmosphere such as vacuum, argon, nitrogen, etc. If the extruded material is presintered, it can then be ground to expose the individual blade heaters and cut to the desired length, for use as a heater in a flavor-generating article.

FIG. 3 shows an exploded view of a heater assembly 10 in accordance with the invention. The heater 10 includes a monolithic ceramic heating element 20, a cage 30, a fixture 40, a compression ring 50 and a pin module 60, further details of which are shown in FIGS. 4–8. The heating element 20 and cage 30 are each tubular in shape with an annular hub 21/31 at one end and a plurality of spaced-apart blades 22/32 extending axially from an axial end of the hub 21/31. The hub 21 of the heating element 20 fits within the hub 31 of the cage 30 and the blades 22/32 of the heating element and cage are arranged in an interdigitated fashion with air gaps 17 between opposed edges of the blades 22/32. Electrical current supplied to a free end of one of the heater blades 22 heats the blade by passing axially through the blade to the hub 31.

As shown in FIG. 3, the free ends of the blades 22 of the heating element are received in slots 41 between circumferentially spaced-apart projections 42 on an outer surface of fixture 40. Cage 30 includes a cross piece 33 extending between free ends of two opposed blades 32 of cage 30. The cross piece 33 includes a hole 34 for receiving a screw (not shown) which attaches cage 30 to one axial end of fixture 40. The hubs 21/31 of heating element 20 and cage 30 are secured to each other by any suitable technique. According to the preferred embodiment, cage 30 is of electrically conductive metal and acts as a common lead for all of the blades of heating element 20. In this case, the hubs 21/31 of heating element 20 and cage 30 are preferably metallurgically bonded together by welding, brazing, soldering, diffusion bonding, etc. Compression ring 50 includes a tapered inner surface 51 which provides a compression fit against the outer surface of projections 42 whereby blades 22 are loosely held in slots 41.

Pin module 60 includes a main body 61 and lead pins 62 for supplying current to the blades 22 of heating element 20. Each pin 62 can be U-shaped (not shown) at the output end thereof for receiving a free end of one of the heater blades 32. The pins 62 are of an electrically conductive material such as metal which can be metallurgically bonded to the heater blades by welding, brazing, soldering, diffusion bonding, etc. Pin module 60 also includes a center pin 64 which is electrically connected to cross piece 34 of cage 30. Thus, current can be individually supplied to input ends 63 of each of the lead pins 62 for selectively heating the heater blades 22 and once the current passes through the heater blade 22 it passes into the cage hub 31, through the cage blades 32 and cross piece 34 to the central common lead pin 64.

Figure 14:
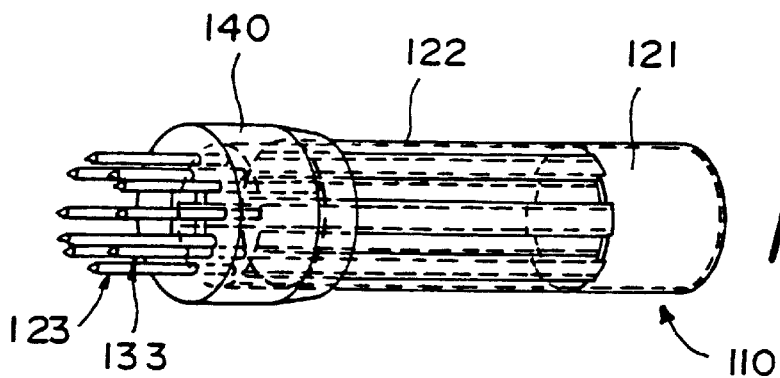
FIG. 14 shows an assembly of the components shown in FIGS. 13a–c.

FIGS. 13a–c and 14 show another embodiment of a heater assembly 110 which includes monolithic heating element 120, cage 130 and socket 140. The heating element 120 includes annular hub 121 and eight circumferentially spaced apart blades 122 extending axially from one axial end of hub 131. Free ends of the heater blades 122 include lead pins 123 extending therefrom and free ends of two opposed cage blades 132 include lead pins 133 extending therefrom. Socket 140 includes through holes 141 for receiving lead pins 123 and 133. As shown in FIG. 14, heater element 120, cage 130 and socket 140 are assembled such that hub 121 surrounds hub 131, or vice versa, and lead pins 123 and 133 pass through holes 141 and extend outwardly from an axial end of socket 140. Socket 140 also includes central air passage 142 extending axially between opposed axial ends of socket 140.

The hub and/or blades can be brazed to electrical connections via a brazing material suitable for joining ceramic material. Examples of suitable brazing materials can be found in publications such as "Joining of Ceramics" by R. E. Loehman et al. published in *Ceramic Bulletin*, 67(2):375–380, 1988; "Oxidation Behavior of Silver- and Copper-Based Brazing Filler Metals for Silicon Nitride/Metal Joints" by R. R. Kapoor et al., published in *J. Am. Ceram. Soc.*, 72(3):448–454, 1989; "Brazing Ceramics Oxides to Metals at Low Temperatures" by J. P. Hammond et al., published in *Welding Research Supplement*, 227–232-s, October 1988; "Brazing of Titanium-Vapor-Coated Silicon Nitride" by M. L. Santella published in *Advanced Ceramic Materials*, 3(5):457–465, 1988; and "Microstructure of Alumina Brazed with a Silver-Copper-Titanium Alloy" by M. L. Santella et al. published in *J. Am. Ceram. Soc.*, 73(6):1785–1787, 1990, the disclosures of which are hereby incorporated by reference.

The electrical resistance ceramic heater of the present invention may be made of a high temperature oxidation-resistant ceramic material that has a sufficiently high electrical resistivity and at the same time exhibits sufficient ductility, yield strength, and hardness. Also, the vapor pressures of the constituents of the ceramic material at 1000° C. are preferably below $10^{-5}$ torr. A preferred oxidation resistant material may be made by percolating high-resistivity materials into other conductive materials or vice versa.

Certain metallic materials or alloys may be suitable for incorporation in the ceramic heater material of the present invention because such materials (1) have certain mechanical properties (ductility, yield strength, hardness) that facilitate processing into complex heater configurations, and (2) are oxidation-resistant, i.e., their oxide layer resists penetration from oxygen, and thus may be available for short time use for between 3 and 4 months. Examples of such suitable metallic materials include nickel, iron, chromium, aluminum, and titanium and compounds thereof such as $Ni_3Al$ or NiAl. The constituents of the ceramic composite, however, are preferably balanced such that the ceramic composite material heats to 650° to 750° C. with a maximum of 25 joules of energy with a 2 second period.

The above-mentioned metallic materials, however, cannot be used alone in a heater configuration according to the invention because they exhibit very low electrical resistivity, on the order of 0.6 to $1.5 \times 10^{-4}$ ohm-cm. That undesirable property cannot easily be corrected by increasing the electrical resistivity of the materials because, in doing so, the metallic materials begin to lose mechanical properties (discussed above) that are desirable for the heater according to the invention.

Rather, a high-resistivity material, on the order of 0.003 to 0.009 ohm-cm, may be percolated throughout the matrix of another material and thereby increase the electrical resistivity of the resultant material, and at the same time maintain the desirable mechanical properties. Certain ceramic materials that exhibit high electrical and thermal insulation are suitable for use in the percolation step. Examples of such ceramic materials include alumina, or partially-stabilized zirconia ($ZrO_2$), calcia, or magnesia. Such ceramic materials may further include oxide and non-oxide ceramics, i.e., carbides, nitrides, silicides, or borides of transition materials.

The resultant material may be processed into the heater configuration by means of the well-known hot-pressing technique, under conditions of high temperature and pressure. Following hot-pressing to full density, the precursor may be ground to reveal a discrete heater segment configuration, as described above. Alternatively, the resultant material may be processed by gel casting the ceramic powders, reaction sintering, mechanical alloying, extrusion or injection-molding techniques known in the art.

Thus, the above-disclosed electrical resistance heater with a discrete heater segment configuration is sufficiently resistant and strong to be used in an electrically powered flavor-generating article, and can be manufactured using inexpensive manufacturing techniques.

Most conventional heating elements are based on Ni—Cr, NiCrAlY, and FeCrAlY alloys, and are useful to temperatures as high as 1200° C. Such heating elements exhibit oxidation resistance due to the formation of oxides such as $Cr_2O_3$, NiO, $Al_2O_3$ and $Fe_2O_3$. Heating elements based on alloying principles provide a maximum resistivity of $1.45 \times 10^{-4}$ ohm-cm. In addition to the resistance heating alloys, there are special heating elements based on thermally stable ceramics such as SiC and $MoSi_2$ for use up to 1500° C. One specialty heating element designed during the last several decades is LaCrO$_3$ for magneto hydrodynamic reactors. Also, miniaturized heating elements with quick response time for gas sensors and heaters made by thick film technology are known in the art. The specialty heating elements can be expensive compared to the conventional alloy-type heating elements, and therefore their use has been limited to industrial applications. The specialty heating elements are brittle, and need to be handled in certain configurations.

The manufacturing processes for making SiC and MoSi$_2$ heating elements are based on sintering principles while the conventional alloy-type heating elements are based on alloying of constituent elements followed by extrusion, rolling, and drawing. Most of the heating elements can be obtained in different shapes and sizes with the same physical properties of the material. Physical properties such as electrical resistivity, density, thermal conductivity, and specific heat are determined by the constituent elements, processing methods, and post-processing techniques.

A thermally stable material which functions as a heater when current from a battery is passed therethrough can be achieved with a wide variety of available heating materials. Most commercially available heating elements, however, cannot provide a rugged heater with a resistance in the range of 1.1 to 3.7 ohm ($\Omega$) when the heating element has a small size with a surface area of 18 mm$^2$ and a volume in the range of 4.5 to 9 mm$^3$. According to the invention, a ceramic material is provided with resistivities at least two orders of magnitude higher than that of commercially available heating elements. In addition, the ceramic materials resistivity can be accurately controlled to a desired value.

Most heating elements based on alloys have undergone excellent mixing at an atomic level due to the melting of components involved in the preparation of the alloys. Further, the variation in resistivity is negligible from source to source. Moreover, the consistency of the manufacturing processes have been so well established that an alloy material with a given composition can be obtained from different sources and the alloy material can be expected to perform in a predictable manner. Structural steel is a good example of such consistency. Certain elements used for heating elements achieve oxidation protection based on protective coatings formed on the surfaces of the heating elements either prior to or in actual use. Also, commercial heating elements based on NiCr, NiCrAlY, and FeCrAlY etc. have a rather high density of 8.0 g/cc or higher, and an effort to decrease the density of the material would require use of different elements or materials. Most metallic elements except Si will oxidize at temperatures above 500° C., and therefore lighter elements by themselves cannot be used for the purposes of obtaining a thermally stable material. Certain compounds of Al, B, Si, Ti and Zr can be used for the purposes of heating elements provided the compounds have thermal stability.

Table 1 sets forth various elements, their densities, melting points, oxides, temperatures at which stable oxides form, the melting point of the oxide and boiling point of the oxide. In order to be useful as a component of the ceramic material according to the invention, the oxide must be stable at temperatures of ambient to 900° C. and avoid outgassing of undesirable gases. For instance, according to one aspect of the invention, the ceramic material can be boron-free to avoid the possibility of forming a toxic boron containing gas during heating of the ceramic material.

Table 2 sets forth various elements, their nitrides, carbides, carbonitrides, silicides and oxides. Table 3 sets forth various elements and the electrical resistivity of their borides, carbides, nitrides, silicides and oxides. Table 4 shows various elements and the oxidation resistance after heating in air at 1000° C. of the borides, carbides, nitrides, and silicides thereof. In order to be useful as a component of the ceramic material according to the invention, the ceramic composite should exhibit a weight gain after being heated to 1000° C. in air of less than 4%, preferably less than 1%.

Table 5 shows examples of ceramic compositions which can be used to make ceramic heaters in accordance with the invention. Table 6 shows various properties of Si$_3$N$_4$, MoSi$_2$, SiC and TiC. Table 7 lists room temperature properties of and 1000° C. oxidation properties of various compounds which could possibly be used in ceramic compositions according to the invention. According to one aspect of the invention, the ceramic heating material can contain less than 10 wt. % of metal oxide constituents, preferably less than 5 wt. % oxide constituents. For instance, the ceramic heating material according to the invention can be substantially metal oxide free.

Figure 10:
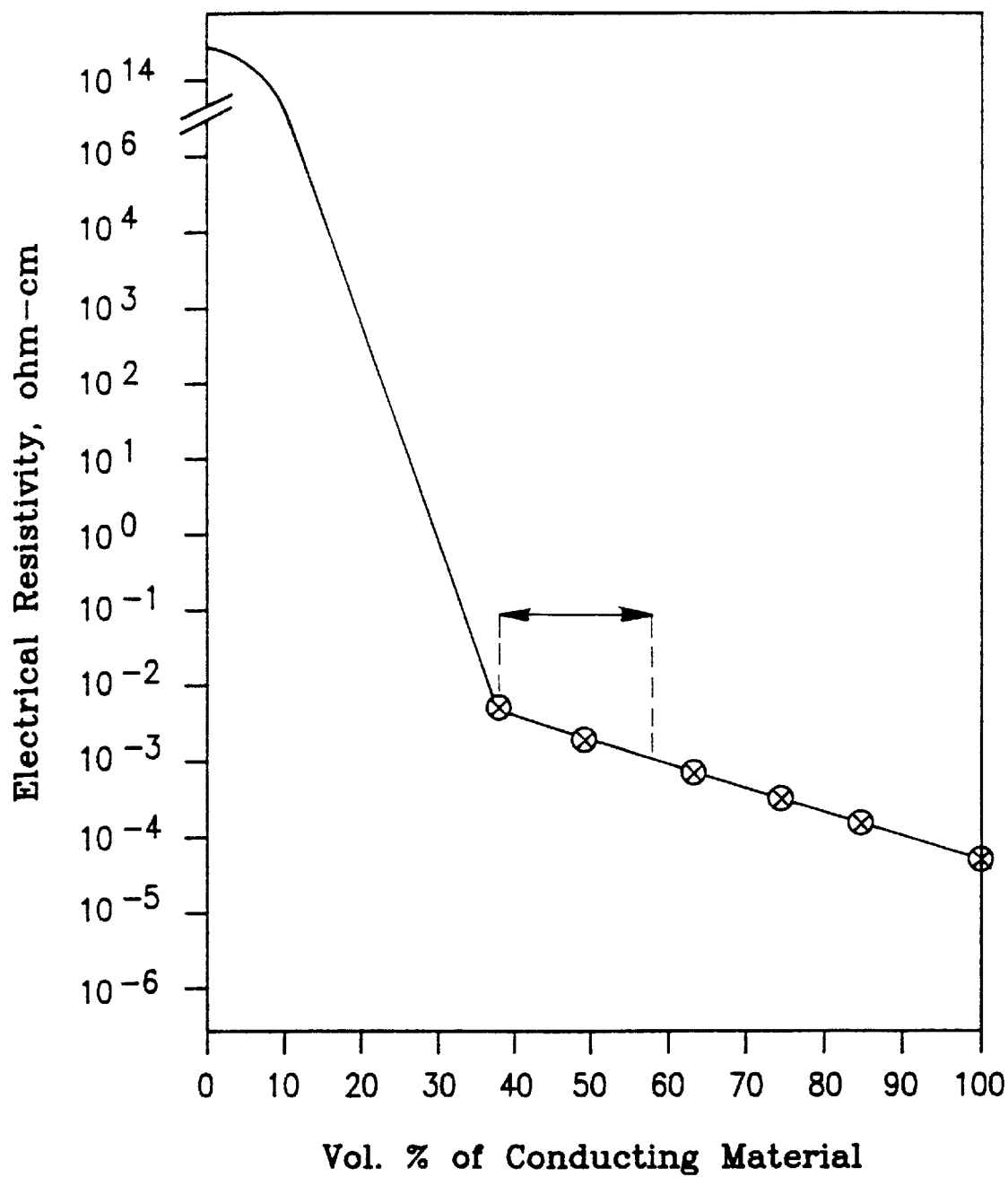
FIG. 10 shows a graph of electrical resistivity vs. vol. % conducting material of a ceramic composite material in accordance with the invention.

FIG. 10 shows a graph of electrical resistivity versus volume percent conducting material of ceramic material. The ceramic material includes conducting compound B and insulating/semiconductive compound A with compound B being present in an amount suitable to provide the desired resistivity. By carefully balancing the compounds and amounts thereof, it is possible to prepare ceramic composite materials useful as heater elements which achieve high temperatures in a short time with low energy inputs of less than 25 joules.

Examples of preparing a ceramic heater material are as follows:

The ceramic material can include, in volume %, 60% Si$_3$N$_4$, 10% SiC, 10% TiC and 20% MoSi$_2$. The Si$_3$N$_4$ serves as an oxidation resistant insulating matrix with low density (3.20 g/cc). SiC is an oxidation resistant semiconductor with a negative temperature coefficient of resistance and low density (3.22 g/cc). TiC is a metallic conductor with excellent hardness and wear resistance and moderate density (4.95 g/cc) but poor oxidation resistance. The composition can be formed into a suitable shape by being hot pressed, hot isostatically pressed or cold isostatically pressed and sintered. Densities of >99% can be achieved consistently under hot pressing and hot isostatic pressing conditions. The samples are machinable by diamond machining, electrical discharge machining, and ultrasonic machining. Green machining followed by sintering can also be done.

Figure 11:
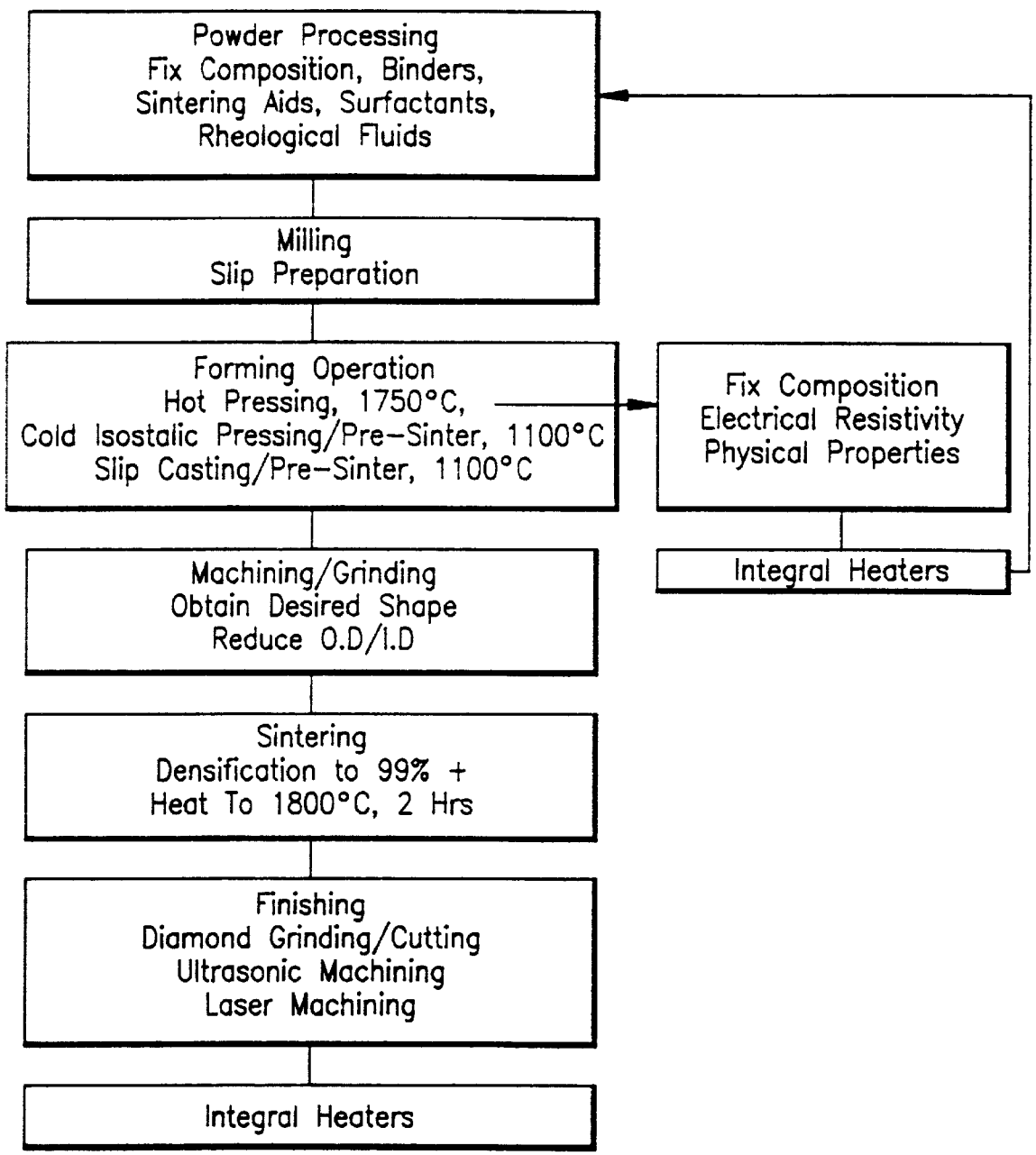
FIG. 11 shows a flow chart of processing steps which can be used to make a ceramic heater in accordance with the invention.
Figure 12:
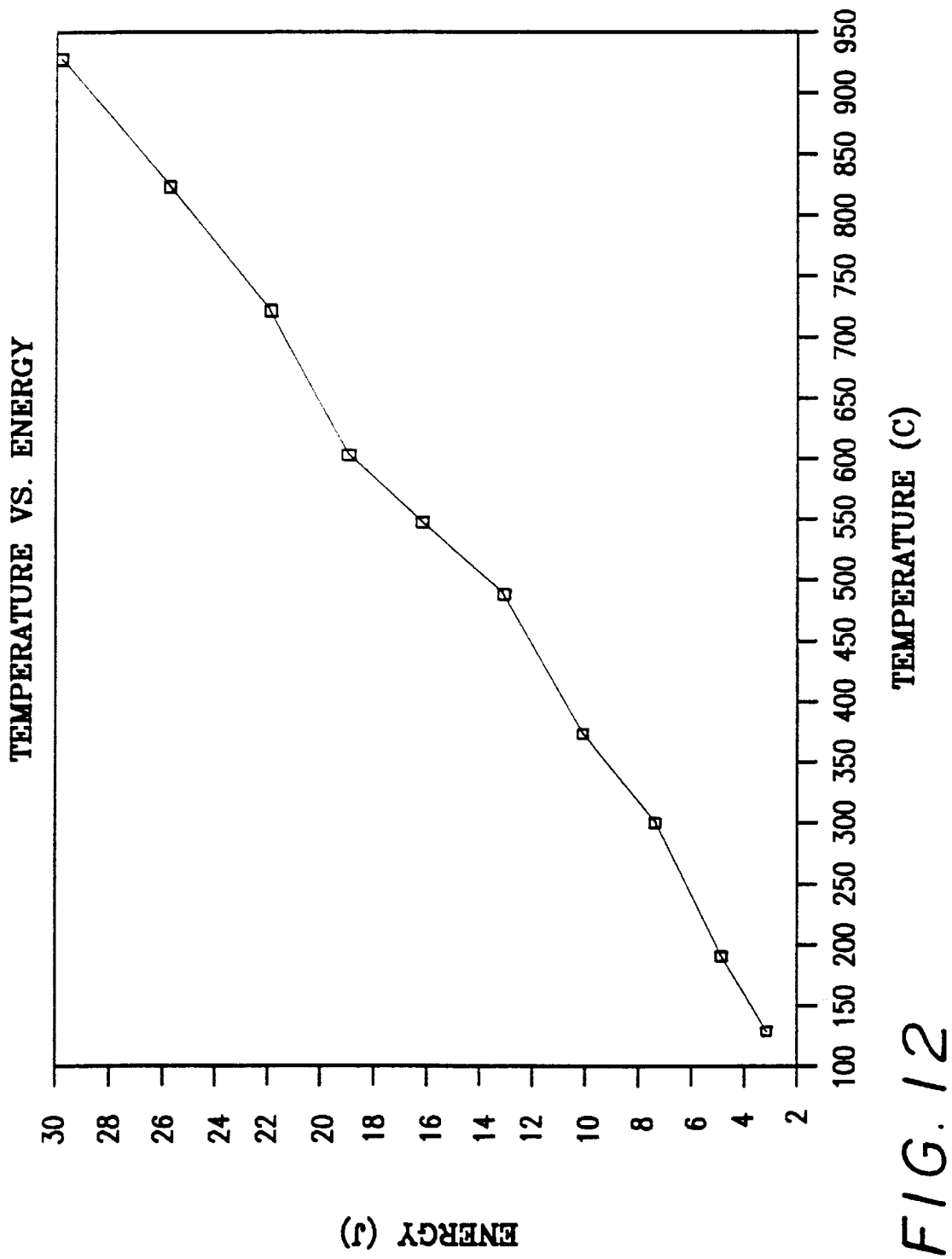
FIG. 12 shows a typical plot of temperature vs. energy for composition No. 8 in Table 5.
Figure 13A:
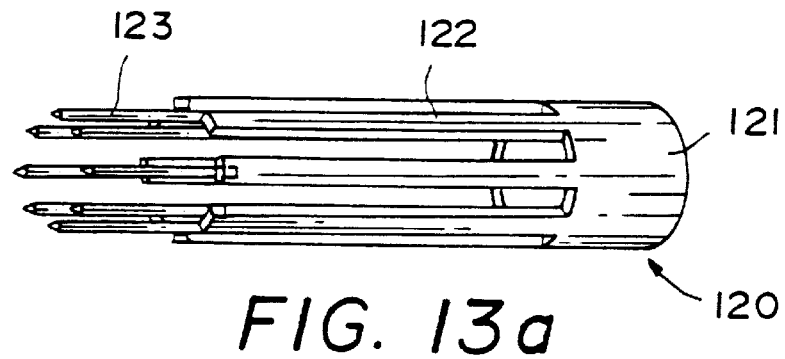
FIGS. 13a–c show perspective views of components of a heater assembly according to another embodiment of the invention.
Figure 13B:
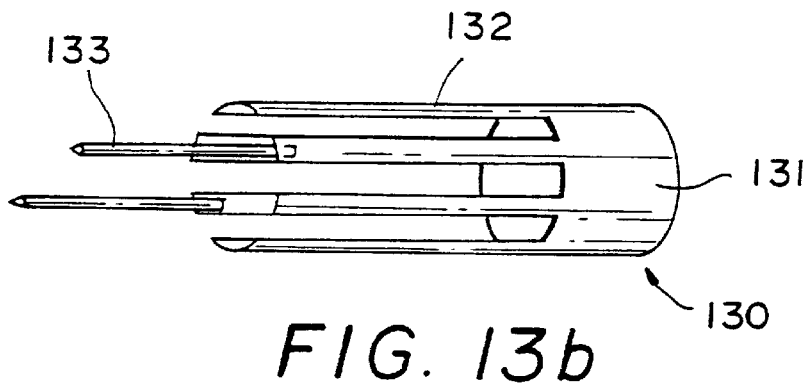
Figure 13C:
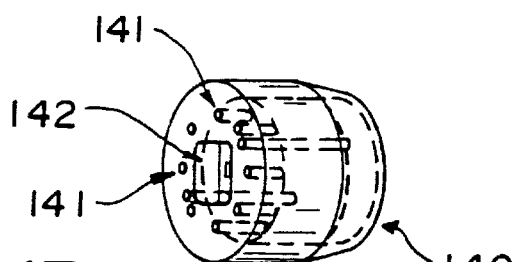

Properties of the ceramic material are as follows. Electrical resistivity is preferably 0.004–0.006 ohm-cm. Thus, single blades with a resistance of about one ohm can be obtained. The material should be fatigue resistant and oxidation resistant when subjected to thermal cyclic pulsing 64,000 times with a 1 second pulse duration and heating to 900° C. In an isothermal test in TGA for six hours at 1000° C. the weight gain should be <1.5%. The voltage, and current, and the maximum temperature recorded with a thermocouple are given in Table 8 for composition No. 8 in Table 5. FIG. 11 indicates the typical energy vs. temperature plot.

Blades of compositions containing greater than ten volume percent TiC, ZrB$_2$, TiB$_2$, may not meet the desired oxidative stability criteria under cyclic and isothermal testing conditions.

Vacuum brazing of contacts can be carried out with 56Ag—36Cu—6Sn—2Ti (wt %) alloy with most ceramic/metal joints contemplated herein. For instance, brazing can be carried out to a ceramic connector in a single step to obtain a reliable, rugged unit. Also, an oxidation resistant ceramic can be used as a matrix and an oxidation resistant alloy/intermetallic as a dispersed phase. Advantages of such a composite include significantly enhanced stiffness, processing on a large scale is possible, bonding is easier than in pure ceramics due to the presence of metals, and liquid metal infiltration can provide a functionally graded composition. The heater can be made by slip casting a tube with an outer $Si_3N_4$ layer and an inner resistive material. The material can be dried, baked and presintered. Then, the tube can be externally ground to the desired O.D. and cut to length after which it is sintered to full density. Thus, it is possible to obtain 25 heaters by slicing the rod into 25 sections with the heater blades having a resistance of about 1 ohm.

Figure 15:
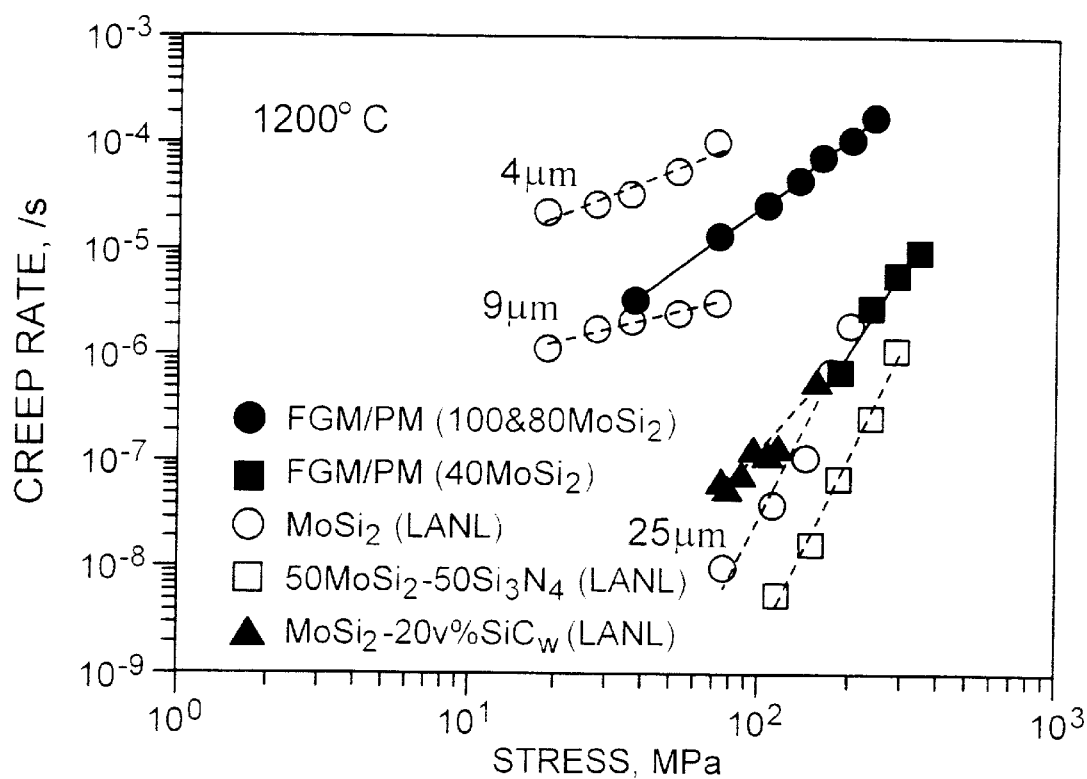
FIG. 15 shows a graph of creep rate versus stress for various ceramic materials including mixtures of $MoSi_2$ and $Si_3N_4$.
Figure 16:
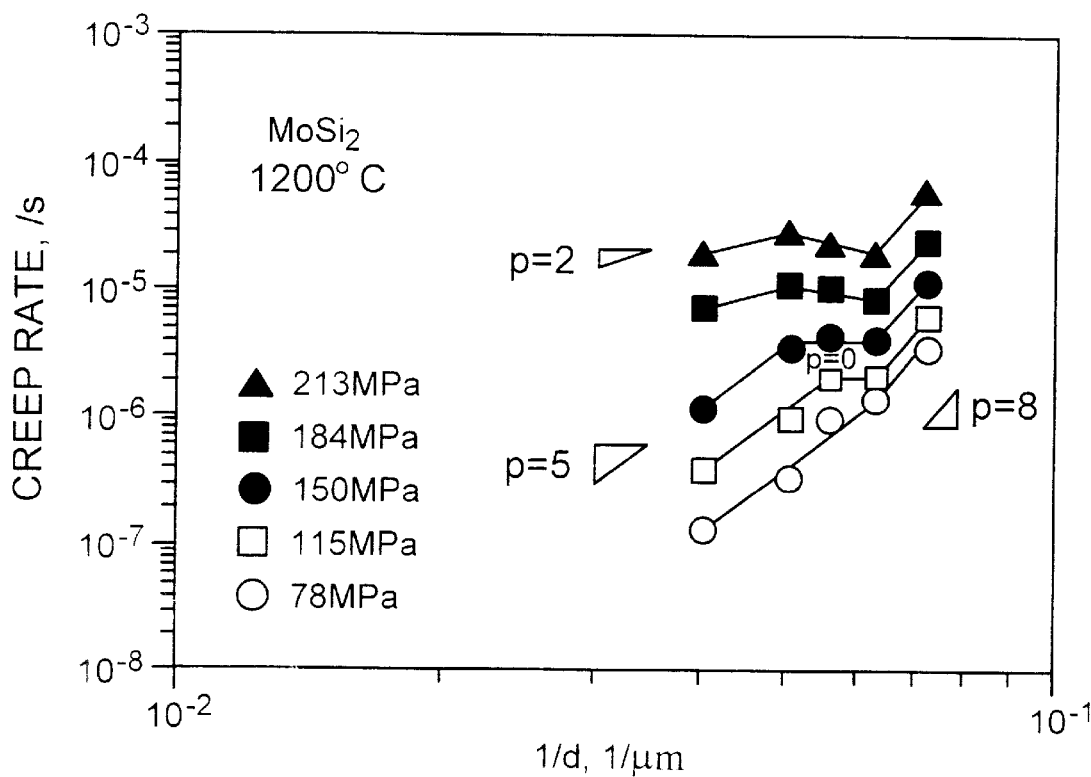
FIG. 16 shows a graph of grain size of $MoSi_2$ versus creep rate of the $MoSi_2$.

A functionally graded ceramic material in accordance with the invention preferably comprises layers of $MoSi_2$ and $Si_3N_4$ in various amounts. FIG. 15 is a graph showing creep rate versus stress for ceramic materials including 100% $MoSi_2$, 80% $MoSi_2$+20% $Si_3N_4$, 40% $MoSi_2$+60% $Si_3N_4$, 50% $MoSi_2$+50% $Si_3N_4$ and 80% $MoSi_2$+20% SiC. The effect of grain size on creep rates of $MoSi_2$ is shown in FIG. 16 and Table 9 shows a comparison of properties of $MoSi_2$ and $Si_3N_4$.

Figure 17:
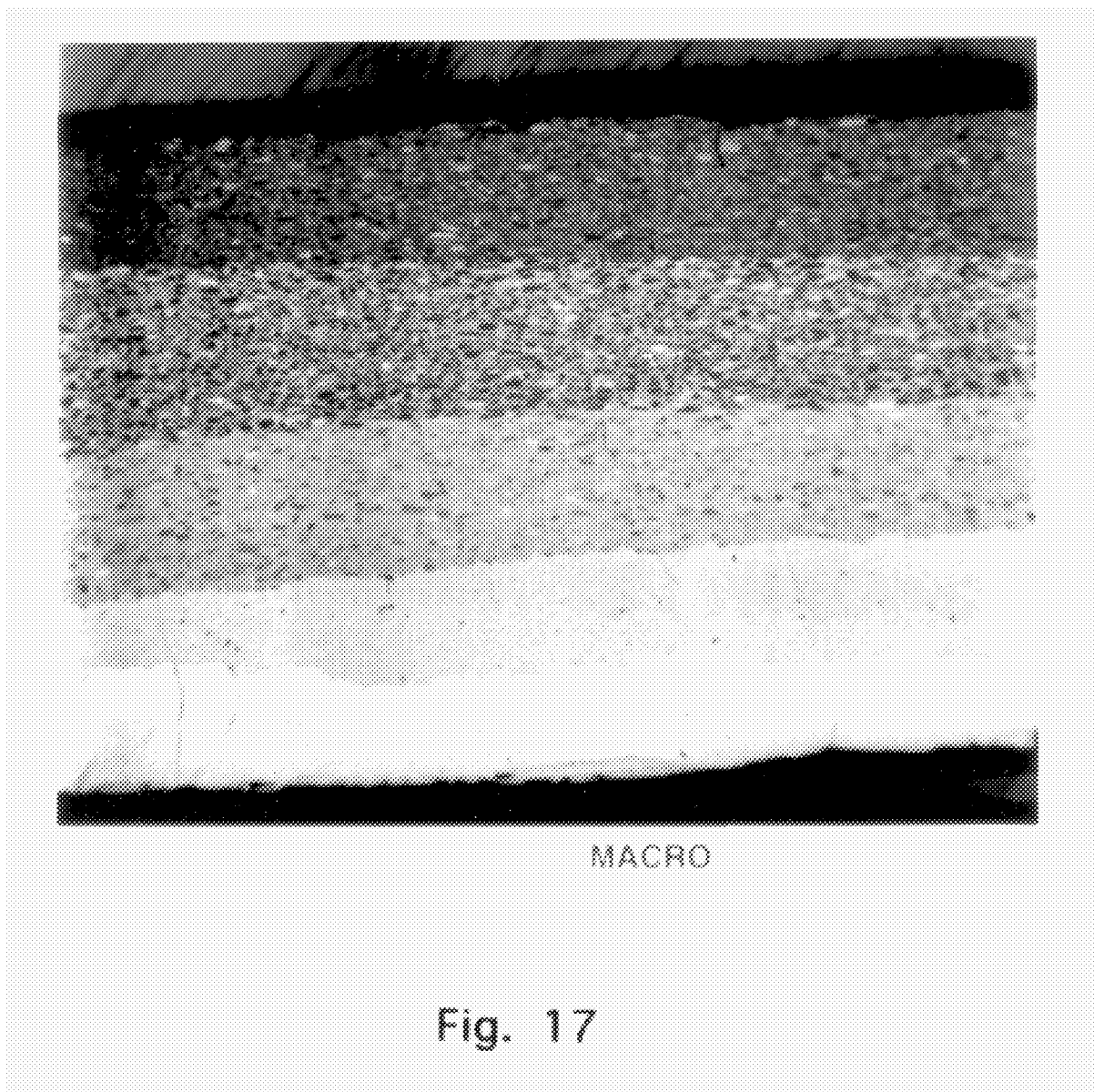
FIG. 17 is a photomicrograph of a five layer functionally graded $MoSi_2/Si_3N_4$ ceramic composite in accordance with the invention.
Figure 18:
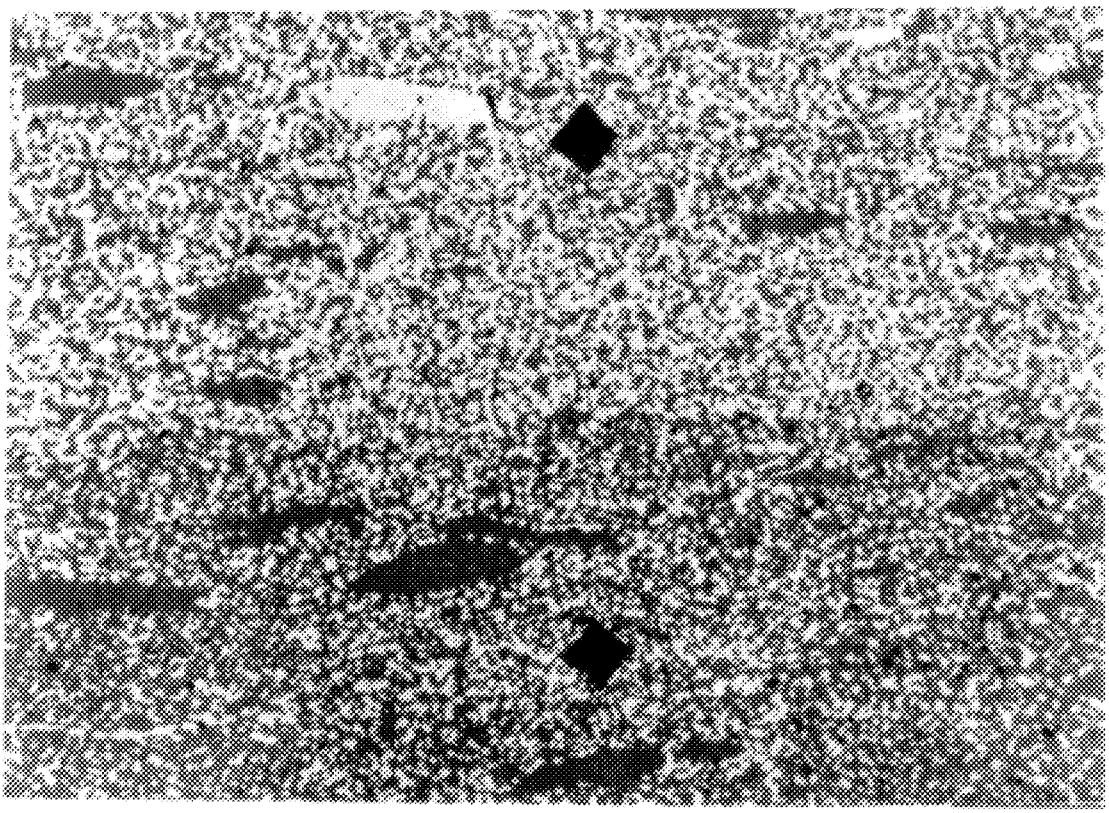
FIG. 18 shows a cross section of adjacent layers of 60% $MoSi_2$+40% $Si_3N_4$ and 40% $MoSi_2$+60% $Si_3N_4$.

A functionally graded ceramic heater can be prepared as follows. First, a container is filled with layers of ceramic powder having different compositions. The powder can have the same size for each constituent or one constituent can have a larger particle size than one or more other constituents of the ceramic material. For example, in the case of a $Si_3N_4$+$MoSi_2$ heater, a first layer can be 100% $MoSi_2$, a second layer can be 80 vol. % $MoSi_2$+20 vol. % $Si_3N_4$, a third layer can be 60 vol. % $MoSi_2$+40 vol. % $Si_3N_4$, a fourth layer can be 40 vol. % $MoSi_2$+60 vol. % $Si_3N_4$, and a fifth layer can be 20 vol. % $MoSi_2$+80 vol. % $Si_3N_4$. Each of the layers can have any suitable thickness such as 4 to 6 mm and once pressed and sintered, the resulting compact can be machined into a desirable heater shape by electrical discharge machining. As shown in FIG. 17, the five layers adhered extremely well. As shown in FIG. 18, there is no evidence of cracking due to hardness indentation marks in adjacent layers of 60% $MoSi_2$+40% $Si_3N_4$ and 40% $MoSi_2$+60% $Si_3N_4$. Results of oxidation in air at various temperatures are set forth in Table 10.

Figure 19:
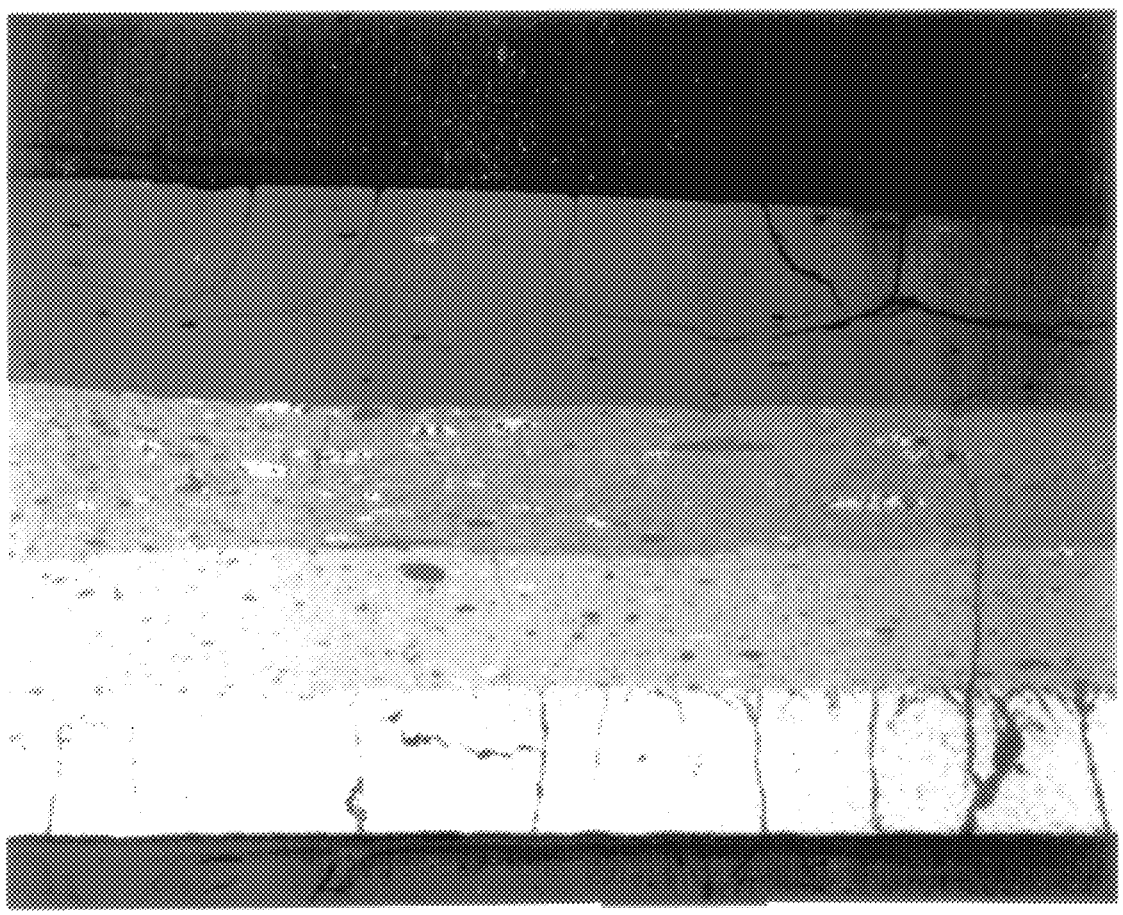
FIG. 19 shows a cross section of a functionally graded ceramic wherein adjacent layers differ in amount of $MoSi_2$ by 40%.
Figure 20:
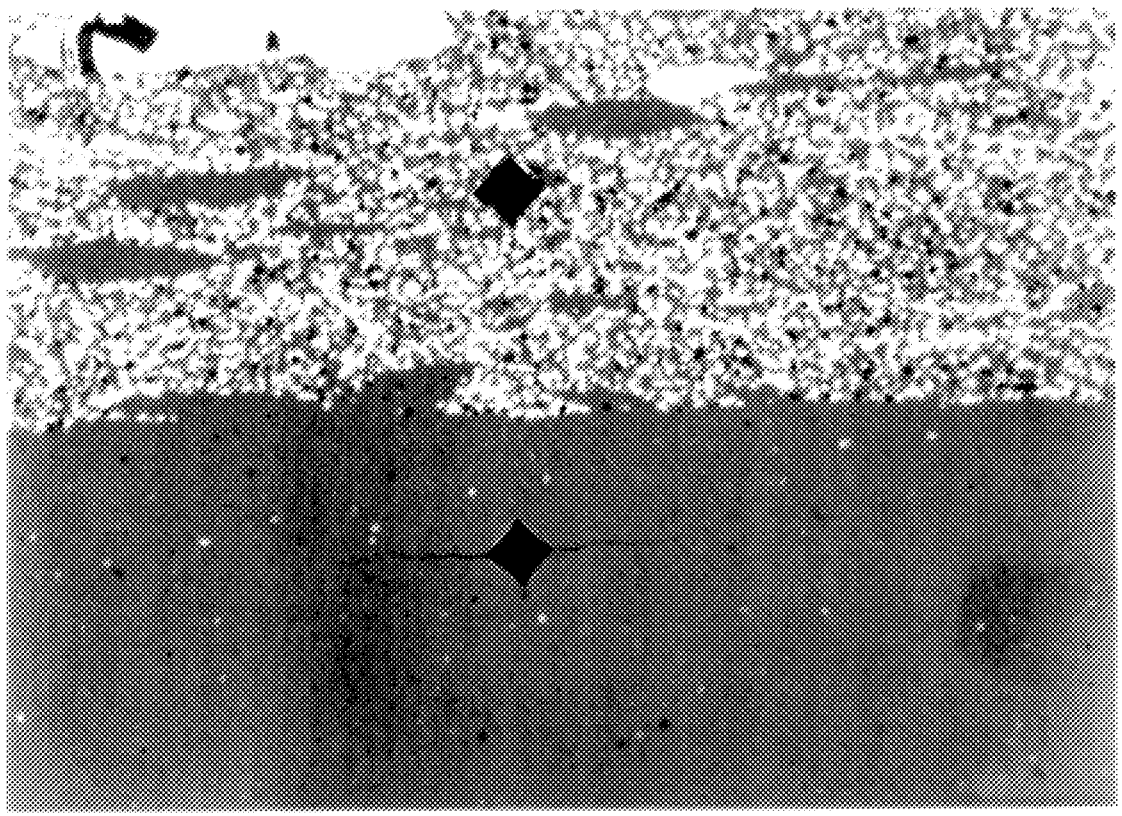
FIG. 20 is a cross section of two layers of a functionally graded ceramic having an upper layer of 60% $MoSi_2$+40% $Si_3N_4$ and a lower layer of 100% $MoSi_2$.

A functionally graded ceramic material was prepared as follows: first, a container was filled with a first layer of 100% $MoSi_2$, a second layer of 60 vol. % $MoSi_2$+40 vol. % $Si_3N_4$, a third layer of 40 vol. % $MoSi_2$+60 vol. % $Si_3N_4$, and a fourth layer of 100 vol. % $Si_3N_4$. The hardness of each of the various layers was measured in transverse and longitudinal directions using a 1 kg load, as set forth in Table 11. As a result of the hardness test, cracking was found in the two outer layers and cracks in the outer layers extended into the middle layers as shown in FIG. 19. As shown in FIG. 20, hardness indentations in 100% $MoSi_2$ (bottom dark layer) and in 60% $MoSi_2$+40% $Si_3N_4$ (top light layer) show evidence of cracking at edges of the indentation marks.

A Stepped Resistive Heater Element

Figure 21:
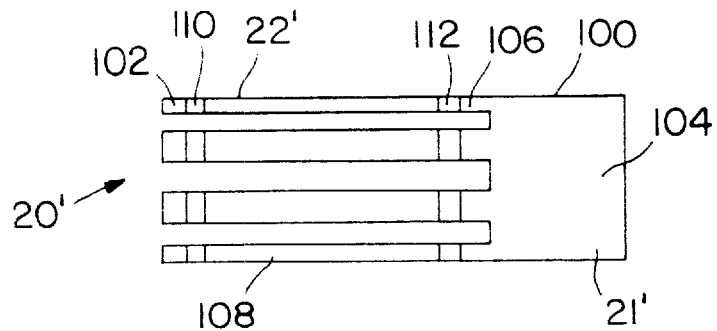
FIG. 21 is side view of a functionally stepped, ceramic heater element constructed in accordance with another preferred embodiment of the present invention.
Figure 22:
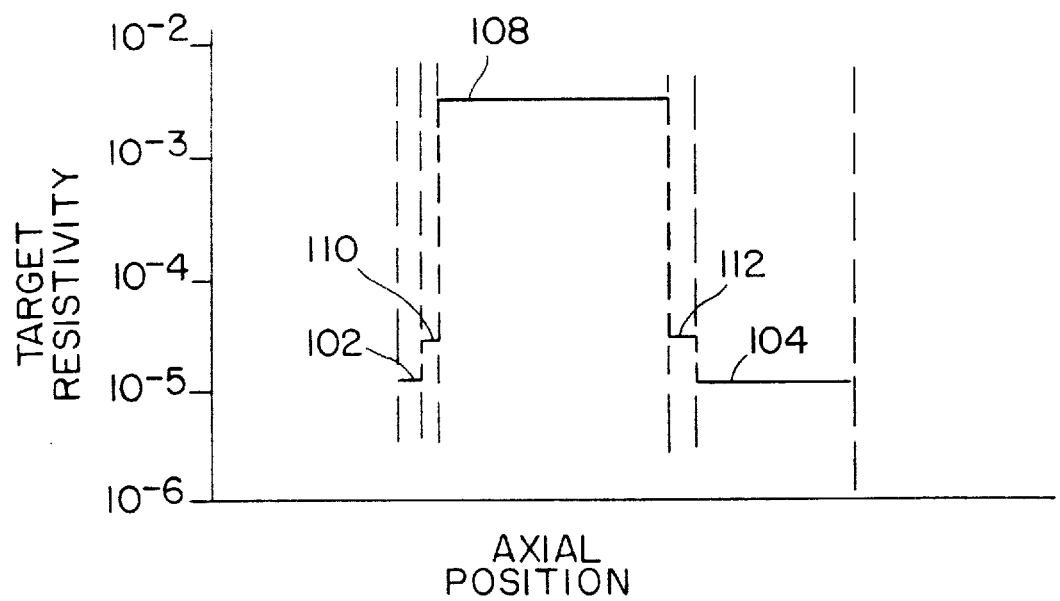
FIG. 22 is representation of the levels of reisistvities associated with the differentiated portions of the ceramic heater element shown in FIG. 21.

Referring now to FIGS. 21 and 22, a preferred embodiment of the present invention is an electrically resistive, functionally stepped, ceramic heater element 20' which is adapted to be operatively established in a heater assembly 10 of an electric lighter 3, preferably in the same manner as was described with respect to the preceding embodiments of the ceramic heater element 20.

The functionally stepped, ceramic heater element 20' is a generally cylindrical, monolithic body 100 which includes a plurality of spaced apart, rectilinear blades 22' extending from a hub 21'. The monolithic body 100 includes a first electrically conductive end portion 102 which preferably encompasses the tips of the blades 22'; a second electically conductive end portion 104 which preferably encompasses the hub 21' and adjacent portions 106 of the blades 22'; an electrically resistive portion 108 which preferably extends along a substantial portion of the blades 22' between the first and second conductive end portions 102 and 104; and transitional portions 110 and 112, which are established inbetween the electrical resistive portion 108 and the electrically conductive end portions 102 and 104, repectively.

In this embodiment, the electrically resistive portion 108 preferably comprises a "ceramic mix" of approximately 35% by volume $MoSi_2$ and 65% $Si_3N_4$. In the dimensional confines of the cigarette lighter 3 for which the ceramic heater element 20' is intended, these relative proportions of the conductive component ($MoSi_2$) and the insulatory component ($Si_3N_4$) in the ceramic mix are such that the resistive portion 108 of the heater element 20' achieves a desired resistivity value of approximately $6\times10^{-3}$ ohm-cm. Of course, the proportionality between the two components and the dimensions of the heater element 20' might be changed to achieve different, predetermined levels of resistivity in the resistive region 108 in accordance with the needs of a broad spectrum of possible applications for the ceramic elenent 20'. In most applications, the electrically resistive portion will be formulated and physically designed to meet a predetermined value of resistivity.

Preferably, the conductive portions 102 and 104 are established as purely conductive as possible from at least one of the conductive ceramic components of the ceramic mix in the resistive portion 108. In the preferred embodiment, the conductive portions 102 and 104 preferably consist essentially of a pure, low porosity $MoSi_2$, so as to establish a resistivity in the conductive portions 102 and 104 of approximately $1\times10^{-5}$ ohm-cm. Such arrangement minimizes resistive losses of power in the conductive portions 102 and 104, which is of special concern when the heater element 20' is operated from limited power sources such as batteries or the like.

In the preferred embodiment, the transitional portions 110 and 112 provide an immediate electrical and compositional transition from the highly conductive portion 102 to the electrically resistive portion 108, and from the electrically resistive portion 108 to the highly conductive portion 104, repectively. Preferably, the physical extent of the transitional portions 110 and 112 are each de minimis in comparison to the physical extent of the electrically resistive portion 108, so that there is established, as closely as possible, a step-function styled change in resistivity from each of the conductive portions 102, 104 to and from the resistive portion 108.

The transitional portions 110 and 112 are established with resistivities of approximately 80 to 95% of the resistivities of the conductive portions 102, 104, and preferably include a marginal amount of at least one of the insulatory components of the ceramic mix of the resistive portion 108. In the preferred embodiment, the transitional portions 110 and 112 each comprise approximately 80% $MoSi_2$ by volume and 20% $Si_3N_4$. The proportional amount of inclusion of the insulatory component ($Si_3N_4$) may vary from application to application and from ceramic mix to ceramic mix, but is readily determinable from experiment and/or analytical techniques pursuant to the requirements of establishing a resistivity 80 to 90% of that of the conductive regions 102, 104, and introducing sufficient content of the insulatory component so that compositional transition is achieved without fissures, unacceptable cracking or the like. Usually, the latter consideration is met by inclusion of at least 15 to 25% of the insulating component ($Si_3N_4$), with the remainder comprising the conductive ceramic component ($MoSi_2$). A limit to the proportional inclusion is the percolation critical point of the ceramic mix where further inclusion of the insulating component transforms the ceramic body of the transitional portions 110, 112 from an electrically conductive one to a resistive one In the preferred embodiment, the transitional portions 110, 112 each comprise approximately 80% $MoSi_2$ and 20% $Si_3N_4$, which proportions establishes a resistivity for the transitional portions 110, 112 of approximately $90 \times 10^{-5}$ ohm-cm.

Alternately, the conductive portions 102 and 104 may comprise a pure form $Mo_5Si_3$, with such being substituted for $MoSi_2$ in the compositions of the intermediate portions 110, 112 and the electrically resistive portion 108.

Referring now particularly to FIG. 22, as one progresses along the heater element 20' from the blade tips to the hub 104, one first traverses a region of high conductivity (low electrical resistivity) throughout the physical extent of the first conductive end portion 102 until arrival at the transitional portion 110 where conductivity is 5 to 15 percent less than the adjacent conductive portion 102. Preferably, the tramsitional portion 110 is of short physical extent so that the minimal losses of power at this region are not physically remote from the resistive portion 108 and so that the electrical transition from the transitional portion 110 to the resistive portion 108 is abrupt and akin to a step function. Once into the resistive portion 108, the percentile content of conducting material ($MoSi_2$) is below the critical (percolation) value so that the portion 108 is electrically resistive at a predetermined, desired level of resistivity (in the preferred embodiment, approximately $6 \times 10^{-3}$ ohm-cm).

In terms of physical extent, a ceramic heater element 20' of an approximately 6 mm diameter preferably includes a first conductive portion 102 at the blade tips of approximately 2 mm length, first and second transitional portions of approximately 2 to 4 mm each (more preferably approximately 2 to 3 mm each), a resistive portion therebetween of approximately 18 mm and a second conductive portion 104 at the hub 21' of approximately 4 mm.

Advantageously, the second conductive portion 104 includes blade portions 106 adjacent the hub 21' so that the transitional region 112 proximate to the hub 21' is located on the blades 22' and slightly spaced from the hub 21'. Consequently, the amount of material encompassed by the transitional region 112 and the resistive losses incurred there are minimized.

A preferred method of constructing the heater element 20' includes the step of first stacking layers of green tape in a sequential order of a first layer of pure $MoSi_2$; a second, thin layer of green tape comprising 80% $MoSi_2$ and 20% $Si_3N_4$; then a thick layer of ceramic composite in accordance with the desired proportions for the resistive portion 108 (in the preferred embodiment, 35% $MoSi_2$ and 65% $Si_3N_4$); followed by a layer like the second and then a layer like the first. This stack is then cut to rough form of the cylindrical shape of the heater element 20', and then partially sintered. The resultant form is then machined closely to a final form and then subjected to final sintering using either hot isostatic pressing or sintering in vacuum or in the presence of argon.

Alternatively, a preliminary form might be constructed by layering composite powders in the prescribed formulations and layers and then partially sintering the pack to form to form a "sintered green body". The body is then machined approximately to final form and then subjected to final sintering using either hot isostatic pressing or sintering in vacuum or in the presence of argon.

TABLE 1

| Element | Density, g/cc | Melting Point °C. | Oxides of the Element | Stable Oxide Forms at | Melting Point of Oxide, °C. | Boiling Point of Oxide, °C. |
|---|---|---|---|---|---|---|
| C | 2.2 | 3550 (4200 BP) | CO, $CO_2$ | — | — | — |
| Si | 2.3 | 1410 | SiO, $SiO_2$ | 1100° C. ($Si_xO_y$) | 1720 | 1977 |
| Al | 2.7 | 660 | $Al_2O_3$ | 600° C. | 2046 | 2980 |
| Ti | 4.5 | 1660 | ($Ti_2O_3$)$TiO_2$ | 700° C. | 1855 | 2927 |
| Zr | 6.45 | 1852 | $ZrO_2$ | 700° C. | 2690 | 4300 |
| Fe | 7.87 | 1535 | ($Fe_3O_4$,FeO), $Ti_2O_2$ | 700° C. | 1562 | — |
| Hf | 13.29 | 2230 | $HfO_2$ | | | Dec. |
| Ta | 16.6 | 2996 | $Ta_2O_5$ | | 1877 | Dec. |
| W | 19.3 | 3410 | $WO_2$ | | 1570 | Dec. |

TABLE 2

| Element | Nitride | Carbide | Carbonitride | Silicide | Oxide |
|---|---|---|---|---|---|
| Al | AlN | | | | $Al_2O_3$ |
| Si | $Si_3N_4$ | SiC | | | $SiO_2$ |
| Ti | TiN | TiC | TiCN | $Ti_5Si_3$ | $TiO_2$ |
| Zr | ZrN | ZrC | Zr(CN) | $ZrSi_2$ | $ZrO_2$ |
| Hf[1] | HfN | HfC | Hf(CN) | $HfSi_2$ | $HfO_2$ |
| Ta[1] | TaN | TaC | Ta(CN) | $TaSi_2$ | $Ta_2O_5$ |
| W[1] | WN | WC | W(CN) | $WSi_2$ | $WO_2$ |
| Fe | $Fe_xN$[2] | $Fe_xC$[2] | $Fe_x(CN)$[2] | $FeSi_2$ | $Fe_2O_3$ |

[1]Form compounds with high density
[2]Oxidize below 700° C.

TABLE 3

| | Electrical Resistivity ($\mu$ ohm-cm) | | | | |
|---|---|---|---|---|---|
| Element | Boride | Carbide | Nitride | Silicide | Oxide |
| B | | $1 \times 10^6$ | $10^{19}$ | | $10^{22}$ |
| Al | | | $10^{19}$ | | |
| Si | | $0.3 \times 10^6$ | $10^{19}$ | | $10^{20}$ |
| Ti | 9.0 | 61 | 40 | 55 | $10^{12}$ |

TABLE 3-continued

| | Electrical Resistivity ($\mu$ ohm-cm) | | | | |
|---|---|---|---|---|---|
| Element | Boride | Carbide | Nitride | Silicide | Oxide |
| Zr | 9.7 | 49 | 18 | 75.8 | $10^{10}$ |
| Hf | 10.6 | 39 | 32 | | |
| Nb | 45 | 119 | 65 | 50.4 | |
| Mo | 25–45 | 71 | 19 | 21 | |

TABLE 4

| | Mass Change at 1000° C. (mg/cm²) | | | |
|---|---|---|---|---|
| Element | Boride | Carbide | Nitride | Silicide |
| B | | −0.8 (20h) | −0.85 (10h) | |
| Al | | | Oxidation | |
| Si | | −5.2 (50h) | +5 (80h) | |
| Ti | 19 (3h) | +1.5 (5h) | +25 (1h) | +4 (3h) |
| Zr | +30 (150h) | −2.0 (5h) | | +2.5 (3h) |
| Hf | | +105 (3h) | | +35 (3h) |
| Nb | +32 (1h) | Active oxidation | | +100 (3h) |
| Mo | +2.5 (5h) | −270 (1h) | | +1.4 (20h) |

TABLE 5

| No. | Volumetric % of Components | | | | | | Hot Press Temp. | Resistivity Ω-cm | Density g/cc | Fracture Strength (MPa) |
|---|---|---|---|---|---|---|---|---|---|---|
| | TiC | MoSi₂ | ZrB₂ | SiC | Si₃N₄ | Al₂O₃ | TiN | | | |
| 1 | 30 | 10 | 0 | 0 | 60 | | | 1800° C. | 0.000645 | 4.02 |
| 2 | 40 | 0 | 0 | 0 | 60 | | | 1800° C. | 0.00286 | 4.41 |
| 4 | 0 | 0 | 40 | 0 | 60 | | | 1800° C. | 0.000415 | 4.38 |
| 5 | 0 | 0 | 30 | 10 | 60 | | | 1800° C. | 0.00138 | 4.08 |
| 6 | 0 | 0 | 25 | 15 | 60 | | | 1800° C. | 0.00231 | 3.94 |
| 7 | 10 | 20 | 0 | 10 | 60 | | | 1800° C. | | |
| 8 | 10 | 18 | 0 | 12 | 60 | | | | | |

TABLE 6

| | Si₃N₄ | MoSi₂ | SiC | TiC |
|---|---|---|---|---|
| Density | 3.20 g/cc | 6.24 g/cc | 3.20 g/cc | 4.95 g/cc |
| Specific Heat cal/(mole °C.) | $32.074 + 4.7867 \cdot 10^{-3}T - 0.23122.6T^{-2}$ | $16 - 2 + 2.86 \times 10^{-3}T - 2.12 \times 10^5 T^{-2}$ | $9.97 + 1.92 \times 10^{-3}T - 0.366 \times 10^6 T^{-2}$ | $11.8 + 0.8 \times 10^{-3}T - 3.58 \times 10^5 T^{-2}$ |
| Thermal Conductivity cal/(cm-sec °C. | 0.0478 | 0.116 | 0.0465 | 0.0717 |
| Thermal Expansion Coefficient 75–1000° C. | 2.75 | 8.25 | 4.7 | 7.95 $\times 10^{-6}$/°C. |
| Thermal Coefficient of Resistance deg −1, $10^3$ | $-6570/T^2$ (700° C.) $-22670/T^2$ (700° C.–1000° C.) | +6.38 | +0.264 | 1.8 |
| Tensile Strength kg/mm² | 1.5 to 2.75 | 28 (980° C.) 29.4 (1200° C.) | 2.8 | 6.5 (0° C.) 5.4 (1000° C.) |
| Compressive Strength kg/mm² | 13.5 | 113.0 (20° C.) 40.5 (1000° C.) | 150 (25° C.) | 138 (20° C.) 87.5 (1000° C.) |
| Modulus of Elasticity kg/mm² | 4700 (20° C.) | 43,000 (20° C.) | 39,400 (20° C.) | 46,000 (20° C.) |
| Vickers Hardness kg/mm² | | 1320–1550 | | 3200–3170 |
| Micro Hardness kg/mm² | | 735 (50 g load) | | |

TABLE 7

| | Room Temperature Electrical Resistivity | Mass Change at 1000° C. | Room Temperature Conducting below $10^{-2}$ | Room Temperature Semiconductive $10^{-2}$–$10^{+2}$ | Room Temperature Insulating above $10^2$ | Room Temperature Coefficient Expansion |
|---|---|---|---|---|---|---|
| | Ω-cm | mg/cm² | Ω-cm | Ω-cm | Ω-cm | + − |
| TiB₂ | $9 \times 10^{-6}$ | 19 (3h) | x | | x | x |
| ZrB₂ | $9.7 \times 10^{-6}$ | 30 (150h) | x | | x | x |

TABLE 7-continued

| | Room Temperature Electrical Resistivity Ω-cm | Mass Change at 1000° C. mg/cm² | Room Temperature Conducting below $10^{-2}$ Ω-cm | Room Temperature Semiconductive $10^{-2}$–$10^{+2}$ Ω-cm | Room Temperature Insulating above $10^2$ Ω-cm | Room Temperature Coefficient Expansion + | - |
|---|---|---|---|---|---|---|---|
| $HfB_2$ | $10.6 \times 10^{-6}$ | | x | | x | x | |
| NbB | $45 \times 10^{-6}$ | 32 (1h) | x | | x | x | |
| MoB | $25–45 \times 10^{-6}$ | 2.5 (5h) | x | | x | x | |
| $B_4C$ | 1 | -.8 (20h) | | x | x | x | |
| SiC | .3 | -5.2 (50h) | | x | | | x |
| TiC | $61 \times 10^{-6}$ | +1.5 (5h) | x | | x | x | |
| ZrC | $49 \times 10^{-6}$ | -2.0 (5h) | x | | x | x | |
| HfC | $39 \times 10^{-6}$ | +1105 (3h) | x | | x | x | |
| NbC | $119 \times 10^{-6}$ | | x | | x | x | |
| MoC | $71 \times 10^{-6}$ | -270 (1h) | x | | x | x | |
| BN | $10^{13}$ | -.85 (10h) | | x | x | | x |
| AlN | $10^{13}$ | | | x | x | | x |
| $Si_3N_4$ | $10^{13}$ | +5 (80h) | | x | x | | x |
| TiN | $40 \times 10^{-6}$ | +25 (1) | x | x | x | x | |
| ZrN | $18 \times 10^{-6}$ | | x | | x | x | |
| HfN | $32 \times 10^{-6}$ | | x | | x | x | |
| NbN | $65 \times 10^{-6}$ | | x | | x | x | |
| MoN | $19 \times 10^{-6}$ | | x | | | | x |
| $Ti_5Si_3$ | $55 \times 10^{-6}$ | +4 (3h) | x | | | x | |
| $ZrSi_2$ | $75.8 \times 10^{-6}$ | +2.5 (3h) | x | | x | x | |
| $NbSi_2$ | $50.4 \times 10^{-6}$ | +100 (3h) | x | | x | x | |
| $MoSi_2$ | $21 \times 10^{-6}$ | +1.4 (20h) | x | | x | x | |
| $B_2O_3$ | $10^{16}$ | | | | x | | x |
| $SiO_2$ | $10^{14}$ | | | | x | | x |
| $TiO_2$ | $10^6$ | | | | x | | x |
| $ZrO_2$ | $10^4$ | | | | x | | x |
| $Al_2O_3$ | $10^{16}$ | | | | x | | x |

TABLE 8

| DC Volts (V) | Current (A) | Energy (J) | Temp. (°C.) |
|---|---|---|---|
| 1.56 | 2.04 | 3.18 | 126 |
| 1.96 | 2.52 | 4.94 | 188 |
| 2.44 | 3.00 | 7.32 | 297 |
| 2.92 | 3.44 | 10.04 | 370 |
| 3.43 | 3.80 | 13.03 | 488 |
| 3.89 | 4.16 | 16.18 | 544 |
| 4.24 | 4.48 | 19.00 | 602 |
| 4.72 | 4.68 | 22.09 | 720 |
| 5.20 | 5.00 | 26.00 | 823 |
| 5.63 | 5.30 | 29.84 | 930 |

TABLE 10

| Temp. | Time | % of Weight Gain |
|---|---|---|
| 600° C. | 234 | 0 |
| 700° C. | 234 | 0 |
| 800° C. | 234 | 0 |
| 900° C. | 234 | 0 |
| 1000° C. | 234 | 0 |
| 1100° C. | 234 | 0 |
| 1300° C. | 24 | 0.084 |
| 1400° C. | 24 | 0.122 |

TABLE 9

Physical and Thermal Properties of $MoSi_2$ AND $Si_3N_4$

| Property | $MoSi_2$ | $Si_3N_4$ |
|---|---|---|
| Density | 6.24 g/cc | 3.20 g/cc |
| Electrical Resistivity (ohm-cm) | $70 \times 10^{-6}$ (metallic conductor) | $10^{16}$ (insulator) |
| Thermal expansion coefficient | 7.2 ppm/°C. | 3.8 ppm/°C. |
| Thermal conductivity at 25° C. | ≅65 w/m-k | ≅37 w/m-k |
| Melting point | 2030° C. | Decomposes above 2100° C. |
| Oxidation resistance | Excellent | Excellent |
| Creep resistance | Creeps above 1200° C. | Good to 1400° C. |
| Intricate machinability | Good/excellent | Can't be done |
| Stability with reinforcements | Good | Good |
| Cost of materials | Low | High |
| Toughness | Low | Low |
| Joining with other materials | Limited information | Investigated to some extent |

TABLE 11

| Comparative | MoSi$_2$/Si$_3$N$_4$ | Hardness Transverse | Hardness Longitudinal |
|---|---|---|---|
| layer 1 | 100/0 | 1103 ± 20 | 1087 ± 28 |
| layer 2 | 60/40 | 1326 ± 136 | 1394 ± 51 |
| layer 3 | 40/60 | 1523 ± 129 | 1448 ± 68 |
| layer 4 | 0/100 | 1224 ± 121 | 1175 ± 140 |

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. An electrically powered ceramic composite heater in an electric cigarette lighter, comprising a heating element of a functionally graded, monolithic, electrically resistance heating ceramic material, the ceramic material being functionally graded due to variation in composition of the ceramic material along the monolithic heating element, the electric lighter being operable to receive a cigarette and heat a portion thereof during a draw upon the cigarette, the heating element including a plurality of heating zones and at least one electrically conductive zone, the heating zones being of a sintered mixture comprising an insulator or semiconductive metal compound A and an electrically conductive metal compound B, the heating element including sequential first, second and third zones arranged next to each other, each of the zones having a different amount of compound A relative to compound B wherein compound A is Si$_3$Ni$_4$ and compound B is MoSi$_2$, the first zone including 35 to 45 vol. % MoSi$_2$ and 65 to 55 vol. % Si$_3$Ni$_4$, the second zone including 55 to 65 vol. % MoSi$_2$ and 45 to 35 vol. % Si$_3$N$_4$ and the third zone including 75 to 85 vol. % MoSi$_2$ and 25 to 15 vol. % Si$_3$N$_4$.

2. An electrically powered ceramic composite heater in an electric cigarette lighter, comprising a heating element of a functionally graded, monolithic, electrically resistance heating ceramic material, the ceramic material being functionally graded due to variation in composition of the ceramic material along the monolithic heating element, the electric lighter being operable to receive a cigarette and heat a portion thereof during a draw upon the cigarette, the heating element including a plurality of heating zones and at least one electrically conductive zone, the heating zones being of a sintered mixture comprising an insulator or semiconductive metal compound A and an electrically conductive metal compound B, the conductive zone including at least 70 vol. % MoSi$_2$ and less than 30 vol. % Si$_3$N$_4$ and the heating zones including at least 55 vol. % Si$_3$N$_4$ and less than 45 vol. % MoSi$_2$.

3. An electrically powered ceramic composite heater in an electric cigarette lighter, comprising a heating element of a functionally graded, monolithic, electrically resistance heating ceramic material, the ceramic material being functionally graded due to variation in composition of the ceramic material along the monolithic heating element, the electric lighter being operable to receive a cigarette and heat a portion thereof during a draw upon the cigarette, the heating element including an annular electrically conductive hub with a central axis and a plurality of electrically resistance heating conductive blades attached to the hub and extending from its perimeter in one direction parallel to the hub's central axis, the hub and the blades forming a hollow cylinder, the hub and blades comprising the functionally graded monolithic electrically resistance heating ceramic material, each of the blades having a resistance (R) of 0.05 to 7 ohms, a length (L), a width (W), and a thickness (T), and the ceramic material has a resistivity (ρ), the blade dimensions being in accordance with the formula:

R=ρ(L/(W×T)).

4. The heater of claim 3, wherein each of the blades has an electrical resistance of about 0.6 to 4 ohms throughout a heating cycle between ambient and 900° C.

5. The heater of claim 3, further comprising a portable energy device electrically connected to the blades.

6. The heater of claim 5, wherein the portable energy device delivers a voltage of about 3 to 6 volts to the heater blades.

7. The heater of claim 3, wherein the hub has an electrical resistance of about 0.5 to 7 ohms.

8. The heater of claim 3, wherein each of the blades has an electrical resistance of about 1 ohm throughout a heating cycle between ambient and 900° C.

9. The heater of claim 3, wherein the hub acts as the common or negative electrical contact for all of the blades.

10. The heater of claim 3, wherein the blades and/or hub include a coating of a brazing material suitable for joining ceramic material.

11. The heater of claim 10, further comprising electrical leads connected to the blades by the brazing material.

12. The heater of claim 10, wherein the ceramic material consists essentially of Si$_3$N$_4$ and MoSi$_2$.

13. The heater of claim 3, further comprising a metal cage comprising a hub and blades, the cage hub fitting against the heater hub and the cage blades extending between the heater blades with air gaps having a width of about 0.1 to 0.25 mm being located between opposed edges of the cage blades and the heater blades.

14. An electric cigarette lighter, comprising:
 a heating element of a functionally graded monolithic electrically resistance heating ceramic material, the ceramic material being functionally graded due to variation in composition of the ceramic material along the monolithic heating element, the heating element being operable to heat a portion of a cigarette supported by the lighter; and
 a cigarette disposed in proximity to the heating element so as to be heated by the heating element, the heating element including:
  an annular hub, the hub having a circumference and a central axis; and
  a plurality of electrically conductive blades, attached to the hub and extending from a perimeter of the hub in a first direction parallel to the hub's central axis, and defining between them spaces and together a cylinder with a blade portion circumference, the hub circumference exceeding the blade portion circumference, each of the blades having a free end remote from the hub functioning to electrically connect the blade to a power and control module of the cigarette lighter, the hub and blades comprising the functionally graded monolithic electrically resistance heating ceramic material;
 the cigarette lighter further including a metal cage comprising a hub and blades, the cage hub fitting against the heater hub and the cage blades extending between the heater blades with air gaps located between opposed edges of the cage blades and the heater blades.

15. An electric cigarette lighter, comprising:

a heating element of a functionally graded monolithic electrically resistance heating ceramic material, the ceramic material being functionally graded due to variation in composition of the ceramic material along the monolithic heating element, the heating element being operable to heat a portion of a cigarette supported by the lighter; and a cigarette disposed in proximity to the heating element so as to be heated by the heating element, the ceramic material comprising a sintered mixture comprising an insulator metal compound A and an electrically conductive metal compound B, the heating element including a plurality of zones, each of the zones having a different amount of compound A relative to compound B.

16. The cigarette lighter of claim 14, wherein the heating element is electrically connected to a lead pin module having leads electrically connected to the heater blades.

17. An electric cigarette lighter, comprising:

a heating element of a functionally graded monolithic electrically resistance heating ceramic material, the ceramic material being functionally graded due to variation in composition of the ceramic material along the monolithic heating element, the heating element being operable to heat a portion of a cigarette supported by the lighter; and a cigarette disposed in proximity to the heating element so as to be heated by the heating element; and a power and control module connected electrically to the heating element.

18. The cigarette lighter of claim 14, wherein the hub of the heater includes at least one air passage therethrough.

19. The cigarette lighter of claim 14, wherein free ends of the heater blades are supported by a lead pin module having lead pins electrically connected to the free ends of the heater blades, the heater hub being open and defining a cavity which extends along the heater blades and the cavity being sized to receive a cigarette.

20. The cigarette lighter of claim 14, further comprising puff sensing means and electrical circuit means for supplying electrical current to one of the heater blades in response to a change in pressure when a smoker draws on a cigarette surrounded by the heater blades.

21. The cigarette lighter of claim 14, wherein the free end of each of the electrically conductive blades is electrically connected to a power and control module such that each blade can be separately and individually activated.

22. The cigarette lighter of claim 15, wherein the heating element includes a heating zone consisting essentially of 35 to 45 vol. % of compound B and 65 to 55 vol. % of compound A.

23. The cigarette lighter of claim 22, wherein the heating zone comprises 55 to 65 vol. % $Si_3N_4$ and 45 to 55 vol. % $MoSi_2$.

24. A method of making an electrically powered ceramic composite heater useful for devices such as electric cigarette lighters comprising steps of:

forming a ceramic material into a heating element of a functionally graded monolithic electrically resistance heating ceramic material, the ceramic material being functionally graded due to variation in composition of the ceramic material along the monolithic heating element, said forming step including the step of shaping the functionally graded monolithic ceramic material into a form capable of receiving a cigarette, the shaping step including forming a compact by placing layers of varying compositions of the ceramic material in a container and pressing the layers together and machining the compact such that the heating elements are formed; and sintering the ceramic material, each of the consisting essentially of $Si_3N_4$ and $MoSi_2$, the $Si_3N_4$ contents of the layers varying in composition such that the $Si_3N_4$ content does not change by more than 20 vol. % from one of the layers to an adjacent one of the layers.

25. The method of claim 24, wherein the $Si_3N_4$ contents do not change by more than 15 vol. % from one layer to the next.

26. An electrically resistive element comprising:

at least one conductive portion consisting essentially of a conductive ceramic component of $MoSi_2$ or $Mo_5Si_3$;

at least one electrically resistive portion consisting essentially of said conductive ceramic component and an electrically insulating ceramic component;

said electrically resistive element further comprising a transitional portion immediately between said conductive portion and said resistive portion, said transitional portion comprising said conductive ceramic component and said insulating component in mutual proportions such that said transitional portion has a resistivity of approximately 80 to 95% of a resistivity of said conductive portion, said insulating ceramic component constituting at least 15% by volume of said transitional portion, the electrically resistive element being tubular and including a hub and a plurality of blades extending from the hub, said at least one conductive portion including a first conductive portion at free ends of said blades and further including a second conductive portion at said hub, said electrically resistive portion located along said blades intermediate of said first and second conductive portions, said transitional portion including first and second transitional portions at locations along said blades immediately between said resistive portion and said first and second conductive portions, respectively.

27. The heater of claim 26, wherein each of the blades has an electrical resistance of about 0.6 to 4 ohms throughout a heating cycle between ambient and 900° C.

28. The heater of claim 26, further comprising a portable energy device electrically connected to the blades.

29. The heater of claim 28, wherein the portable energy device delivers a voltage of about 3 to 6 volts to the heater blades.

30. The heater of claim 26, wherein the hub has an electrical resistance of about 0.5 to 7 ohms.

31. The heater of claim 26, wherein each of the blades has an electrical resistance of about 1 ohm throughout a heating cycle between ambient and 900° C.

32. The heater of claim 26, wherein the hub acts as the common or negative electrical contact for all of the blades.

33. The heater of claim 26, wherein at least one of the blades and hub include a coating of a brazing material suitable for joining ceramic material.

34. The heater of claim 33, further comprising electrical leads connected to the blades by the brazing material.

35. The heater of claim 26, further comprising a metal cage comprising a hub and blades, the cage hub fitting against the heater hub and the cage blades extending between the heater blades with air gaps having a width of about 0.1 to 0.25 mm being located between opposed edges of the cage blades and the heater blades.

36. The heater of claim 26, wherein the insulating ceramic material consists essentially of $Si_3N_4$.

37. The heater of claim 36, wherein the first and second conductive portions consist essentially of $MoSi_2$, said transitional portions consist essentially of approximately 15 to 25% by volume $Si_3N_4$ and a remaining volume of $MoSi_2$.

38. The heater of claim 36, wherein the first and second conductive portions consist essentially of $MoSi_2$, said first and second transitional portions consist essentially of approximately 20% by volume $Si_3N_4$ and 80% $MoSi_2$, said resistive portion comprising approximately 35% $MoSi_2$ and approximately 65% $Si_3N_4$.

39. The heater of claim 36, wherein the first and second conductive portions consist essentially of $Mo_5Si_3$, said transitional portions consist essentially of approximately 15 to 25% by volume $Si_3N_4$ and a remaining volume of $Mo_5Si_3$.

40. The heater of claim 36, wherein the first and second conductive portions consist essentially of $Mo_5Si_3$, said first and second transitional portions consist essentially of approximately 20% by volume $Si_3N_4$ and 80% $Mo_5Si_3$, said resistive portion comprising approximately 35% $Mo_5Si_3$ and approximately 65% $Si_3N_4$.

* * * * *